United States Patent
Li et al.

(10) Patent No.: US 12,218,983 B2
(45) Date of Patent: Feb. 4, 2025

(54) SECURITY PROTECTION METHOD AND APPARATUS, AND ACCESS NETWORK DEVICE

(71) Applicant: HUAWEI TECHNOLOGIES CO., LTD., Guangdong (CN)

(72) Inventors: He Li, Shanghai (CN); Jing Chen, Shanghai (CN); Liwei Qiu, Shenzhen (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1040 days.

(21) Appl. No.: 16/990,317

(22) Filed: Aug. 11, 2020

(65) Prior Publication Data

US 2020/0374320 A1 Nov. 26, 2020

Related U.S. Application Data

(63) Continuation of application No. PCT/CN2019/074281, filed on Jan. 31, 2019.

(30) Foreign Application Priority Data

Feb. 11, 2018 (CN) .......................... 201810143062.6

(51) Int. Cl.
*H04L 29/06* (2006.01)
*H04L 9/40* (2022.01)
(Continued)

(52) U.S. Cl.
CPC ........... *H04L 63/205* (2013.01); *H04W 12/02* (2013.01); *H04W 76/15* (2018.02); *H04W 76/27* (2018.02); *H04L 63/0428* (2013.01)

(58) Field of Classification Search
CPC .. H04L 63/205; H04L 63/0428; H04W 12/02; H04W 76/15; H04W 76/27; H04W 36/0069; H04W 36/22
See application file for complete search history.

(56) References Cited

U.S. PATENT DOCUMENTS 8,949,927 B2 * 2/2015 Arnott ................... H04W 12/08
380/255
11,558,745 B2 * 1/2023 Wifvesson .......... H04W 12/033
(Continued)

FOREIGN PATENT DOCUMENTS

CN 103841082 A * 6/2014
CN 103959829 A 7/2014
(Continued)

OTHER PUBLICATIONS

"EN-DC (E-UTRAN—New Radio) Dual Connectivity"—3GPP www.3GPP.org/Change-Requests May 15, 2017 (Year: 2017).*
(Continued)

*Primary Examiner* — Randy A Scott
(74) *Attorney, Agent, or Firm* — Fish & Richardson P.C.

(57) ABSTRACT

Embodiments of this application provide security protection methods and apparatuses. One method includes: obtaining, by a master station, a user plane security policy, wherein the user plane security policy indicates whether to activate a user plane security protection, the master station communicates with a secondary station under a dual connectivity scenario; sending, by the master station, a message comprising the user plane security policy to the secondary station; receiving, by the secondary station, the message from the master station; and determining, by the secondary station, a user plane security algorithm based on the user plane security policy.

18 Claims, 10 Drawing Sheets

(51) Int. Cl.
*H04W 12/02* (2009.01)
*H04W 76/15* (2018.01)
*H04W 76/27* (2018.01)

(56) References Cited

U.S. PATENT DOCUMENTS

| | | | | |
|---|---|---|---|---|
| 2010/0064341 A1* | 3/2010 | Aldera | ................ | H04W 8/245 726/1 |
| 2016/0309379 A1 | 10/2016 | Pelletier et al. | | |

FOREIGN PATENT DOCUMENTS

| | | | |
|---|---|---|---|
| CN | 104936171 | A | 9/2015 |
| CN | 106941700 | A | 7/2017 |
| CN | 107070805 | A | 8/2017 |
| CN | 107277853 | A | 10/2017 |
| CN | 109586900 | A | 4/2019 |
| CN | 110830992 | A | 2/2020 |
| EP | 3731550 | A1 | 10/2020 |
| RU | 2573256 | C2 | 1/2016 |
| WO | 2015037926 | A1 | 3/2015 |
| WO | 2015139434 | A1 | 9/2015 |
| WO | 2018000644 | A1 | 1/2018 |
| WO | WO-2018137255 A1 * | | 8/2018 ........... H04L 63/061 |

OTHER PUBLICATIONS

"EN-DC (E-UTRAN—New Radio) Dual Connectivity"—3GPP, Sep. 2017 https://blog.wirelessmoves.com/2017/09/5g-part-3-dual-connectivity-en-dc.html (Year: 2017).*
"5G PPP Phase1 Security Landscape"—5G PPP Security WG, Jun. 2017 https://5g-ppp.eu/wp-content/uploads/2014/02/5G-PPP_White-Paper_Phase-1-Security-Landscape_June-2017.pdf (Year: 2017).*
EP Communication Pursuant to Article 94(3) EPC in European Appln No. 19751734.5, dated Feb. 2, 2023, 8 pages.
3GPP TS 33.401 V15.2.0 (Jan. 2018), "3rd Generation Partnership Project; Technical Specification Group Services and System Aspects; 3GPP System Architecture Evolution (SAE); Security architecture (Release 15)," Jan. 2018, 163 pages.
3GPP TS 33.501 V0.7.0 (Jan. 2018), "3rd Generation Partnership Project; Technical Specification Group Services and System Aspects;Security architecture and procedures for 5G system (Release 15)," Jan. 2018, 109 pages.
3GPP TR 33.899 V0.5.0 (Oct. 2016), "3rd Generation Partnership Project; Technical Specification Group Services and System Aspects;Study on the security aspects of the next generation system(Release 14)," Oct. 2016, 244 pages.
3GPP TS 37.340 V1.1.0 (Oct. 2017), "3rd Generation Partnership Project; Technical Specification Group Radio Access Network;Evolved Universal Terrestrial Radio Access (E-UTRA) and NR;Multi-connectivity;Stage 2(Release 15)," Oct. 2017, 44 pages.
3GPP TS 38.413 V0.6.0 (Jan. 2018), "3rd Generation Partnership Project;Technical Specification Group Radio Access Network;NG-RAN;NG Application Protocol (NGAP)(Release 15)," Jan. 2018, 94 pages.
3GPP TS 38.423 V0.6.0 (Jan. 2018), "3rd Generation Partnership Project;Technical Specification Group Radio Access Network;NG-RAN; Xn application protocol (XnAP) (Release 15)," Jan. 2018, 76 pages.
ETSI TS 133 501 V15.1.0 (Jul. 2018), "5G;Security architecture and procedures for 5G System(3GPP TS 33.501 version 15.1.0 Release 15)," Jul. 2018, 150 pages.
Office Action issued in Chinese Application No. 201810143062.6 on Dec. 19, 2019, 22 pages (with English translation).
Office Action issued in Chinese Application No. 201810143062.6 on Jul. 13, 2020, 21 pages (with English translation).
Office Action issued in Russian Application No. 2020129822/07(053736) on Apr. 21, 2022, 18 pages (with English translation).
NEC, "Security mechanism for EN-DC (E-UTRAN—New Radio Dual Connectivity," 3GPP TSG-SA WG3 Meeting #87, Ljubljana, Slovenia, May 15-19, 2017, 10 pages.
Extended European Search Report in European Application No. 19751734.5, dated Mar. 11, 2021, 12 pages.

* cited by examiner

SECURITY PROTECTION METHOD AND APPARATUS, AND ACCESS NETWORK DEVICE

CROSS-REFERENCE TO RELATED APPLICATIONS

This application is a continuation of International Application No. PCT/CN2019/074281, filed on Jan. 31, 2019, which claims priority to Chinese Patent Application No. 201810143062.6, filed on Feb. 11, 2018. The disclosures of the aforementioned applications are hereby incorporated by reference in their entireties.

TECHNICAL FIELD

This application relates to the field of communications technologies, and in particular, to a security protection method and apparatus, and an access network device.

BACKGROUND

In a dual connectivity architecture, a terminal can access both a master station and a secondary station. In a long term evolution (LTE) dual connectivity architecture, both a master station and a secondary station are evolved NodeBs (evolved NodeB, eNB or eNodeB) in a 4th generation (4G) network. In this architecture, the master station may be represented as a master eNodeB or an MeNB, and the secondary station may be represented as a secondary eNodeB or an SeNB. Similar to LTE, a 5th generation (5G) network may also support a dual connectivity technology. In a dual connectivity architecture of the 5G network, both a master station and a secondary station may be next generation base stations (gNB) in the 5G network. Alternatively, a master station is a gNB in the 5G network, and a secondary station is an eNB in the 4G network. Alternatively, a master station is an eNB in the 4G network, and a secondary station is a gNB in the 5G network.

In the dual connectivity architecture, a network side device may send user plane data to a terminal by using a master station and a secondary station. In the 4G network, whether user plane security protection is enabled is fixed. Therefore, in the LTE dual connectivity architecture, whether the secondary station enables user plane security protection is determined. However, in the 5G network, user plane security protection may be enabled as required. Therefore, in the dual connectivity architecture of the 5G network, if the 5G network still uses a 4G dual connectivity technology, user plane security protection cannot be enabled as required.

SUMMARY

This application provides a security protection method and apparatus, and an access network device, to resolve a problem that user plane security protection cannot be enabled as required in the prior art.

According to a first aspect, an embodiment of this application provides a security protection method. The method is applied to a dual connectivity scenario. The scenario includes a first access network device and a second access network device, the first access network device is a secondary station in the dual connectivity, and the second access network device is a master station in the dual connectivity. The method includes:

receiving, by the first access network device, a first message from the second access network device, where the first message carries a user plane security policy, and the user plane security policy is used to indicate a type of user plane security protection to be enabled by the first access network device; and then determining, by the first access network device, a user plane security algorithm based on the user plane security policy if the first access network device can identify the user plane security policy; or determining, by the first access network device, a user plane security algorithm based on a default user plane security policy if the first access network device cannot identify the user plane security policy. Optionally, the first access network device may further determine a user plane key corresponding to the user plane security algorithm. According to the method, when the first access network device can identify the user plane security policy from the second access network device, the first access network device may determine the user plane security algorithm based on the user plane security policy from the second access network device, to enable the user plane security algorithm as required. If the first access network device cannot identify the user plane security policy from the second access network device, the first access network device may further determine the user plane security algorithm based on the default user plane security policy. This ensures security of user plane data transmitted between the first access network device and a terminal.

The first access network device may be an SN, and the SN is a secondary station in dual connectivity or multi-connectivity. The SN may be a 5G base station gNB or a 4G base station eNB; or may be a non-3GPP access technology, for example, a Wi-Fi access technology or a fixed network access technology; or a network element that has a gateway function and that is in the non-3GPP access technology, for example, an N3IWF network element in a 5G network, an ePDG in a 4G network, or an FMIF accessed by a 5G fixed network. The eNB may be further classified into an enhanced eNB or an original eNB. The enhanced eNB may also be referred to as an updated eNB, and the original eNB may also be referred to as a legacy eNB. The enhanced eNB refers to that the eNB can identify signaling that can be identified by the 5G gNB and also has a related function of the 5G gNB. For example, the enhanced eNB supports an Xn interface, and can identify all content of the Xn interface. For another example, the enhanced eNB supports user plane integrity protection, and can identify a security policy.

The second access network device may be an MN, and the MN is a master station (that is, a master station) in dual connectivity or multi-connectivity. A function of the second access network device may be determining whether to enable a dual connectivity or multi-connectivity mode to serve a terminal device to forward data. The MN may further be a station that uniquely interacts with a core network control plane network element. Optionally, the MN may be a 5G base station gNB, a 4G base station LTE eNB, or a 4G enhanced base station e-eNB or NR-eNB; or may be a non-3GPP access technology, for example, a Wi-Fi access technology or a fixed network access technology; or a network element that has a gateway function and that is in the non-3GPP access technology, for example, an N3IWF network element in a 5G network, an ePDG in a 4G network, or an FMIF accessed by a 5G fixed network.

In a possible design, the first message further carries granularity information corresponding to the user plane security policy. In this case, the first access network device and the second access network device perform security protection on user plane data at a same granularity by using a same type of user plane security algorithm. Therefore, a case in which the terminal needs to perform security verification on the user plane data at the same granularity by using different types of user plane security algorithms does not occur, and complexity of terminal processing does not increase.

Optionally, the granularity information corresponding to the user plane security policy represents a granularity at which the user plane security policy can be used. The granularity information may be any one or more of a PDU session identifier, a QoS parameter (for example, a QFI), slice information (for example, a slice identifier), 5-tuple information, and DN information.

In a possible design, the first access network device may further send a second message to the second access network device, where the second message is a response message for the first message, the second message carries first indication information, and the first indication information is used to indicate a type of user plane security protection to be enabled by the terminal. According to the method, after determining the user plane security algorithm, the first access network device notifies the terminal of the type of the to-be-enabled user plane security protection, so that the terminal and the first access network device can enable a same user plane security protection type, and the terminal can perform security verification on user plane data on which security protection is performed by using the first access network device.

Optionally, the type of the user plane security protection to be enabled by the terminal indicated by the first indication information may be the same as or different from the type of the user plane security protection to be enabled by the first access network device indicated by the user plane security policy. If the first access network device determines the user plane security algorithm based on the user plane security policy, the type of the user plane security protection to be enabled by the terminal indicated by the first indication information is the same as the type of the user plane security protection to be enabled by the first access network device indicated by the user plane security policy. If the first access network device does not determine the user plane security algorithm based on the user plane security policy, the type of the user plane security protection to be enabled by the terminal indicated by the first indication information is different from the type of the user plane security protection to be enabled by the first access network device indicated by the user plane security policy.

In a possible design, the second message further carries one or both of the user plane security algorithm determined by the first access network device and the granularity information that corresponds to the first indication information. It may be understood that after receiving the second message, the second access network device may send, to the terminal, one or both of the user plane security algorithm determined by the first access network device and the granularity information. Therefore, the terminal may generate a user plane key by using a same user plane security algorithm as that of the first access network device, and perform security verification on received user plane data based on the granularity information.

In a possible design, the first message further carries an offloading type of the dual connectivity, and the offloading type is secondary-station based offloading or dual-station based offloading.

The secondary-station based offloading means that security protection is performed, by using a user plane key of the secondary station, on user plane data that needs to be sent by a UPF network element to the terminal. The dual-station based offloading means that security protection is performed, by using a user plane of the master station, on data forwarded by the master station to the terminal, and security protection is performed, by using a user plane of the secondary station, on data forwarded by the secondary station to the terminal.

In a possible design, the first access network device may further send a third message to the terminal, where the third message carries second indication information, and the second indication information is used to indicate the type of the user plane security protection to be enabled by the terminal. According to the method, the first access network device may directly notify the terminal of the type of the to-be-enabled user plane security protection, and the type of the to-be-enabled user plane security protection does not need to be forwarded by the second access network device, thereby reducing signaling overheads. In addition, the terminal and the first access network device enable a same user plane security protection type, so that the terminal can perform security verification on user plane data on which security protection is performed by using the first access network device.

In a possible design, the third message further carries one or both of the user plane security algorithm determined by the first access network device and the granularity information that corresponds to the second indication information.

In a possible design, the offloading type is master station offloading, and the first access network device may receive a fourth message from the second access network device, where the fourth message carries the offloading type. The master station offloading means that the master station performs security protection on user plane data that needs to be sent by the UPF network element to the terminal. According to the method, the second access network device may notify, by using the fourth message, the first access network device that the offloading type is master station offloading, so that the first access network device does not need to determine the user plane security algorithm.

According to a second aspect, an embodiment of this application provides a security protection method. The method is applied to a dual connectivity scenario. The scenario includes a first access network device and a second access network device. The first access network device is a secondary station in the dual connectivity, and the second access network device is a master station in the dual connectivity. The method includes:

obtaining, by the second access network device, a user plane security policy, and sending, by the second access network device, a first message to the first access network device, where the first message carries the user plane security policy. The user plane security policy is used to indicate a type of user plane security protection to be enabled by the second access network device. According to the method, the second access network device may indicate a type of user plane security protection to be enabled by the first access network device by sending the first message to the first access network device. Then, the first access network device may determine a user plane security algorithm based on the user plane security policy from the second access network device, so that the user plane security algorithm is enabled as required.

In a possible design, the first message further carries granularity information corresponding to the user plane security policy. In this case, the first access network device and the second access network device perform security protection on user plane data at a same granularity by using a same type of user plane security algorithm. Therefore, a case in which a terminal needs to perform security verification on the user plane data at the same granularity by using different types of user plane security algorithms does not occur, and complexity of terminal processing does not increase.

In a possible design, the first message further carries an offloading type of the dual connectivity, and the offloading type is secondary-station based offloading or dual-station based offloading.

In a possible design, the second access network device may further receive a second message from the first access network device, where the second message is a response message for the first message, the second message carries first indication information, and the first indication information is used to indicate a type of user plane security protection to be enabled by a terminal.

In a possible design, after the second access network device receives the second message from the first access network device, the second access network device may send a third message to the terminal, where the third message carries second indication information, and the second indication information is used to indicate the type of the user plane security protection to be enabled by the terminal. According to the method, after determining the user plane security algorithm, the first access network device notifies the terminal of the type of the to-be-enabled user plane security protection, so that the terminal and the first access network device can enable a same user plane security protection type, and the terminal can perform security verification on user plane data on which security protection is performed by using the first access network device.

In a possible design, before the second access network device sends the third message to the terminal, the second access network device determines the first indication information as the second indication information if the first indication information is consistent with the user plane security policy. Alternatively, the second access network device rejects access of the first access network device if the first indication information is inconsistent with the user plane security policy. According to the method, before notifying the terminal of the type of the to-be-enabled user plane security protection, the second access network device checks the first indication information, so that it can be ensured that the terminal and the first access network device enable a same user plane security protection type.

In a possible design, before the second access network device sends the third message to the terminal, the second access network device checks whether the first indication information from the first access network device is received, and determines the first indication information as the second indication information if the second access network device receives the first indication information from the first access network device; or determines, based on the first message, whether the first access network device is a legacy eNB if the second access network device does not receive the second indication information from the first access network device, and checks the user plane security policy if the first access network device is a legacy eNB.

If the user plane security policy is enabling user plane encryption protection and not enabling user plane integrity protection, the second access network device generates second indication information based on the user plane security policy. The second indication information is used to instruct the terminal to enable user plane encryption protection but not to enable user plane integrity protection.

Alternatively, if the user plane security policy is not enabling user plane encryption protection but enabling user plane integrity protection, the second access network device rejects access of the first access network device.

Alternatively, if the user plane security policy is not enabling user plane encryption protection but enabling user plane integrity protection, the second access network device modifies the user plane security policy to enabling user plane encryption protection and not enabling user plane integrity protection, and further generates second indication information based on the modified user plane security policy. The second indication information is used to instruct the terminal to enable user plane encryption protection but not to enable user plane integrity protection.

In another possible design, before the second access network device sends the third message to the terminal, the second access network device determines whether the user plane security policy is allowed to be inconsistent with the first indication information.

If the second access network device allows the user plane security policy to be inconsistent with the first indication information, the second access network device uses the first indication information as the second indication information.

Alternatively, if the second access network device does not allow the user plane security policy to be inconsistent with the first indication information, and the second access network device determines that the first indication information is consistent with the user plane security policy, the second access network device uses the first indication information as the second indication information.

Alternatively, if the second access network device does not allow the user plane security policy to be inconsistent with the first indication information, and the second access network device determines that the first indication information is inconsistent with the user plane security policy, the second access network device rejects access of the first access network device.

In a possible design, the offloading type is secondary-station based offloading, and after the second access network device receives the second message from the first access network device, the second access network device may use the first indication information as the second indication information.

In a possible design, before the second access network device sends the first message to the first access network device, the second access network device may determine that the offloading type of the dual connectivity is secondary-station based offloading.

According to a third aspect, an embodiment of this application provides a security protection method. The method is applied to a dual connectivity scenario. The scenario includes a first access network device and a second access network device. The first access network device is a secondary station in the dual connectivity, and the second access network device is a master station in the dual connectivity. The method includes: sending, by the first access network device, a first message to a core network device, where the first message is used to request to obtain a user plane security policy, the user plane security policy is used to indicate a type of to-be-enabled user plane security protection. Then, the first access network device receives a second message from the core network device, where the second message carries the user plane security policy, and the first access network device determines a user plane security algorithm based on the user plane security policy. According to the method, the first access network device may request to obtain the user plane security policy from the core network device, and then determine the user plane security algorithm based on the user plane security policy. To be specific, the first access network device determines the type of the to-be-enabled user plane security protection based on the user plane security policy instead of directly enabling a fixed user plane security protection type, so that user plane security protection is enabled as required.

Optionally, the first access network device is an SN, the second access network device is an MN, and the core network device is an SMF network element.

A specific implementation in which the first access network device sends the first message to the core network device is as follows: The first access network device sends the first message to an AMF network element, and then the AMF network element forwards the first message to the SMF network element.

A specific implementation in which the core network device sends the second message to the first access network device is as follows: The SMF network element sends the second message to the AMF network element, and the AMF network element forwards the second message to the first access network device.

In a possible design, the first access network device determines a user plane key based on the user plane security algorithm.

In a possible design, before the first access network device sends the first message to the core network device, the first access network device receives a third message from the second access network device, and the third message carries granularity information of user plane security protection.

Optionally, the core network device may select, based on the granularity information, a user plane security policy corresponding to the granularity information. In other words, the user plane security policy in the second message is the user plane security policy corresponding to the granularity information.

In a possible design, after the first access network device determines the user plane security algorithm based on the user plane security policy, the first access network device may send indication information to a terminal, and the indication information is used to indicate a type of user plane security protection to be enabled by the terminal.

Optionally, the type of the user plane security protection to be enabled by the first access network device indicated by the user plane security policy is the same as the type of the user plane security protection to be enabled by the terminal indicated by the indication information, but an indication method of the user plane security policy and an indication method of the indication information may be the same or may be different.

According to a fourth aspect, an embodiment of this application provides a security protection method. The method is applied to a dual connectivity scenario. The scenario includes a first access network device and a second access network device, the first access network device is a secondary station in the dual connectivity, and the second access network device is a master station in the dual connectivity. The method includes: receiving, by a core network device, a first message from the first access network device, where the first message is used to request to obtain a user plane security policy, and the user plane security policy is used to indicate a type of to-be-enabled user plane security protection; and then sending, by the core network device, the user plane security policy to the first access network device. According to the method, the first access network device may request to obtain the user plane security policy from the core network device, and the core network device may provide the user plane security policy for the first access network device, so that the first access network device can determine a user plane security algorithm based on the user plane security policy. In other words, the first access network device determines the type of the to-be-enabled user plane security protection based on the user plane security policy instead of directly enabling a fixed user plane security protection type, so that user plane security protection is enabled as required.

In a possible design, the first message further carries granularity information, and the core network device may determine the user plane security policy based on the granularity information, and further send a second message to the first access network device, where the second message carries the user plane security policy corresponding to the granularity information.

According to a fifth aspect, an embodiment of this application provides a security protection method. The method is applied to a dual connectivity scenario. The scenario includes a first access network device and a second access network device, the first access network device is a secondary station in the dual connectivity, and the second access network device is a master station in the dual connectivity. The method includes: receiving, by a terminal, indication information from the first access network device or the second access network device, where the indication information is used to indicate a type of user plane security protection to be enabled by the terminal; and then determining, by the terminal, a user plane security algorithm based on the indication information. According to the method, the terminal may determine the user plane security algorithm based on the indication information, so that the terminal uses a same security algorithm as that of the first access network device, and further can perform security verification on user plane data on which security protection is performed by using the first access network device.

According to a sixth aspect, an embodiment of this application provides an apparatus. The apparatus has a function of implementing behavior of the first access network device in the foregoing method designs. The function may be implemented by hardware, or may be implemented by hardware executing corresponding software. The hardware or the software includes one or more modules corresponding to the foregoing function. For example, the apparatus may be a first access network device, or may be a chip in a first access network device.

In a possible design, the apparatus is an access network device, and the access network device is a first access network device. The first access network device includes a processor, and the processor is configured to support the first access network device in performing corresponding functions in the foregoing methods. Further, the first access network device may further include a transmitter and a receiver. The transmitter and the receiver are configured to support communication between the first access network device and a terminal, and communication between a second access network device and a core network device. Further, the first access network device may further include a memory, and the memory is configured to: be coupled to the processor, and store program instructions and data necessary for the terminal.

According to a seventh aspect, an embodiment of this application provides an apparatus. The apparatus has a function of implementing behavior of the second access network device in the foregoing method designs. The function may be implemented by hardware, or may be implemented by hardware executing corresponding software. The hardware or the software includes one or more modules corresponding to the foregoing function. For example, the apparatus may be a second access network device, or may be a chip in a second access network device.

In a possible design, the apparatus is an access network device, and the access network device is a second access network device. The second access network device includes a processor, and the processor is configured to support the second access network device in performing corresponding functions in the foregoing methods. Further, the second access network device may further include a transmitter and a receiver. The transmitter and the receiver are configured to support communication between the second access network device and a terminal, and communication between a first access network device and a core network device. Further, the second network device may further include a memory, and the memory is configured to: be coupled to the processor, and store program instructions and data necessary for the terminal.

According to an eighth aspect, an embodiment of this application provides an apparatus. The apparatus has a function of implementing behavior of the core network device in the foregoing method designs. The function may be implemented by hardware, or may be implemented by hardware executing corresponding software. The hardware or the software includes one or more modules corresponding to the foregoing function. For example, the apparatus may be a core network device, or may be a chip in a core network device.

In a possible design, the apparatus is a core network device, and the core network device includes a processor. The processor is configured to support the core network device in performing corresponding functions in the foregoing methods. Further, the core network device may further include a transmitter and a receiver. The transmitter and the receiver are configured to support communication between the core network device and a first access network device, and communication between the core network device and a second access network device. Further, the core network device may further include a memory, and the memory is configured to: be coupled to the processor, and store program instructions and data necessary for the terminal.

According to a ninth aspect, an embodiment of this application provides an apparatus. The apparatus has a function of implementing behavior of the terminal in the foregoing method designs. The function may be implemented by hardware, or may be implemented by hardware executing corresponding software. The hardware or the software includes one or more modules corresponding to the foregoing function. For example, the apparatus may be a terminal, or may be a chip in a terminal.

In a possible design, the apparatus is a terminal, and the terminal includes a processor. The processor is configured to support the terminal in performing corresponding functions in the foregoing methods. Further, the terminal may further include a transmitter and a receiver. The transmitter and the receiver are configured to support communication between the terminal and a first access network device, and communication between the terminal and a second access network device. Further, the terminal may further include a memory, and the memory is configured to: be coupled to the processor, and store program instructions and data necessary for the terminal.

According to a tenth aspect, an embodiment of this application provides a communications system. The system includes the terminal, the first access network device, and the second access network device in the foregoing aspects. Optionally, the system may further include a core network device and the terminal, the first access network device, and the second access network device in the foregoing aspects.

According to an eleventh aspect, an embodiment of this application provides a computer storage medium, configured to store a computer software instruction used by the foregoing first access network device. The computer software instruction includes a program designed for performing the first aspect and the third aspect.

According to a twelfth aspect, an embodiment of this application provides a computer storage medium, configured to store a computer software instruction used by the foregoing second access network device. The computer software instruction includes a program designed for performing the second aspect.

According to a thirteenth aspect, an embodiment of this application provides a computer storage medium, configured to store a computer software instruction used by the foregoing core network device. The computer software instruction includes a program designed for performing the fourth aspect.

According to a fourteenth aspect, an embodiment of this application provides a computer storage medium, configured to store a computer software instruction used by the foregoing terminal. The computer software instruction includes a program designed for performing the fifth aspect.

According to a fifteenth aspect, an embodiment of this application provides a computer program product including an instruction. When the computer program product is run on a computer, the computer performs the methods according to the first aspect and the third aspect.

According to a sixteenth aspect, an embodiment of this application provides a computer program product including an instruction. When the computer program product is run on a computer, the computer performs the method according to the second aspect.

According to a seventeenth aspect, an embodiment of this application provides a computer program product including an instruction. When the computer program product is run on a computer, the computer performs the method according to the fourth aspect.

According to an eighteenth aspect, an embodiment of this application provides a computer program product including an instruction. When the computer program product is run on a computer, the computer performs the method according to the fifth aspect.

According to a nineteenth aspect, an embodiment of this application provides a chip system applied to a first access network device. The chip system includes at least one processor, a memory, and a transceiver circuit. The memory, the transceiver circuit, and the at least one processor are connected to each other through lines. The at least one memory stores an instruction. The instruction is executed by the processor, to execute operations of the first access network device in the methods according to the first aspect and the third aspect.

According to a twentieth aspect, an embodiment of this application provides a chip system applied to a second access network device. The chip system includes at least one processor, a memory, and a transceiver circuit. The memory, the transceiver circuit, and the at least one processor are connected to each other through lines. The at least one memory stores an instruction. The instruction is executed by the processor, to execute operations of the second access network device in the method according to the second aspect.

According to a twenty-first aspect, an embodiment of this application provides a chip system applied to a core network device, where the chip system includes at least one processor, a memory, and a transceiver circuit. The memory, the transceiver circuit, and the at least one processor are connected to each other through lines. The at least one memory stores an instruction. The instruction is executed by the processor, to execute operations of the core network device in the method according to the fourth aspect.

According to a twenty-second aspect, an embodiment of this application provides a chip system applied to a terminal, where the chip system includes at least one processor, a memory, and a transceiver circuit. The memory, the transceiver circuit, and the at least one processor are connected to each other through lines. The at least one memory stores an instruction. The instruction is executed by the processor, to execute operations of the terminal in the method according to the fifth aspect.

According to the security protection method provided in the embodiments of this application, the second access network device may send the user plane security policy to the first access network device, and then the first access network device may determine the user plane security algorithm based on the user plane security policy. To be specific, the first access network device determines the type of the to-be-enabled user plane security protection based on the user plane security policy instead of directly enabling the fixed type of user plane security protection, so that user plane protection is enabled as required

DESCRIPTION OF EMBODIMENTS

Figure 1:
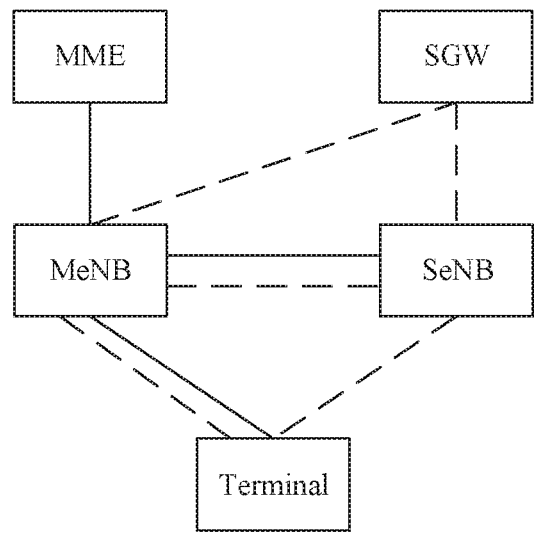
FIG. 1 is a schematic diagram of an LTE dual connectivity architecture according to an embodiment of this application.

The following further describes this application in detail with reference to the accompanying drawings. A specific operation method in method embodiments may also be applied to an apparatus embodiment or a system embodiment. In the descriptions of this application, unless otherwise stated, "at least one" means one or more, and "a plurality of" means two or more. "/" means "or". For example, AB may represent A or B. "and/or" in this specification describes only an association relationship for describing associated objects and represents that three relationships may exist. For example, A and/or B may represent the following three cases: Only A exists, both A and B exist, and only B exists. A and B may be singular or plural. "At least one (one piece) of the following" or a similar expression thereof refers to any combination of these items, including any combination of singular items (pieces) or plural items (pieces). For example, at least one (one piece) of a, b, and c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms, such as "first" and "second", are not intended to limit a quantity or an execution sequence; and the terms, such as "first" and "second", do not indicate a definite difference.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

It should be noted that in this application, "of (English: of)", "corresponding (English: corresponding, relevant)", and "corresponding (English corresponding)" may be interchangeably used sometimes. It should be noted that, consistent meanings are expressed when differences are not emphasized.

Before the technical solutions of this application are described in detail, for ease of understanding, a scenario to which the embodiments of this application are applied is described first.

As shown in FIG. 1, FIG. 1 is an LTE dual connectivity (DC) architecture. The architecture includes a mobility management entity (MME), a serving gateway (SGW), an MeNB, an SeNB, and a terminal. In FIG. 1, a solid line represents signaling plane interaction, and a dashed line represents user plane interaction.

The terminal in this application is a device having a wireless transceiver function, and may be deployed on land, including an indoor or outdoor device, a handheld device, or a vehicle-mounted device. It can also be deployed on the water surface (such as a ship) or in the air (for example, on aircraft, balloons, satellites, and the like). The terminal may include various types of user equipment (user equipment, UE), a mobile phone, a tablet (pad), a computer with a wireless transceiver function, a wireless data card, a virtual reality (VR) terminal device, an augmented reality (AR) terminal device, a machine-type communication (MTC) terminal device, a terminal device in industrial control, a terminal device in self-driving, a terminal device in remote medical, a terminal device in a smart grid, a terminal device in transportation safety, a terminal device in a smart city, a wearable device (such as a smartwatch, a smart band, or a pedometer), and the like. In systems using different radio access technologies, names of devices having similar wireless communication functions may be different. Only for ease of description, in the embodiments of this application, the foregoing devices having wireless transceiver communication functions are collectively referred to as terminals.

Specifically, the terminal stores a long-term key and a related function. When performing bidirectional authentication with a core network element (for example, an MME in 4G), the terminal may verify authenticity of a network by using the long-term key and the related function.

The MeNB is a master station in the LTE DC architecture. The master station may perform control plane signaling interaction with the MME, or may perform user plane data interaction with the SGW.

The SeNB is a secondary station in the LTE DC architecture, and the master station may determine whether to enable the secondary station. The secondary station does not perform signaling interaction with the MME. Therefore, the secondary station cannot access the MME. There is signaling plane interaction and user plane interaction between the secondary station and the master station, and the secondary station may further directly perform user plane interaction with the SGW.

The MME is a core network element in a 4G network, and is mainly responsible for terminal access, mobility management, and session management. In the LTE DC architecture, there is a control plane connection between the MME and the master station, and there is no control plane connection between the MME and the secondary station.

The SGW is a network element configured to forward user plane data. In the LTE DC architecture, the SGW may be connected to the master station only, or may be connected to both the master station and the secondary station. If the SGW is connected to the master station only, the SGW sends the user plane data to the master station, the master station forwards some user plane data to the secondary station, and the secondary station forwards the data to the terminal. When the SGW is connected to both the master station and the secondary station, the SGW may send some user plane data to the master station, and send some other user plane data to the secondary station.

Figure 2:
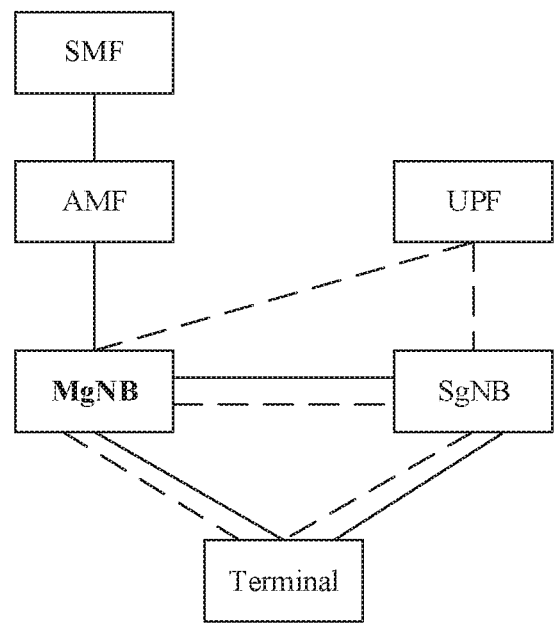
FIG. 2 is a schematic diagram of a 5G dual connectivity architecture according to an embodiment of this application.

In addition to the LTE DC architecture shown in FIG. 1, the embodiments of this application further provide three possible 5G dual connectivity architectures:

A first 5G dual connectivity architecture is shown in FIG. 2. Both a master station and a secondary station are gNBs of a 5G network. The master station may be represented as a master gNB or an MgNB, and the secondary station may be represented as a secondary gNB or an SgNB.

Figure 3:
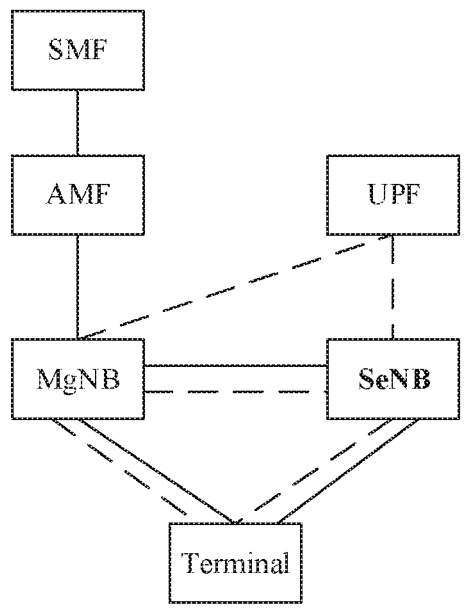
FIG. 3 is a schematic diagram of another 5G dual connectivity architecture according to an embodiment of this application.

A second 5G dual connectivity architecture is shown in FIG. 3. A master station is a gNB of the 5G network, and the master station may be represented as a master gNB or an MgNB. The secondary station is an eNB of an LTE network, and the secondary station may be represented as a secondary eNB or an SeNB.

Figure 4:
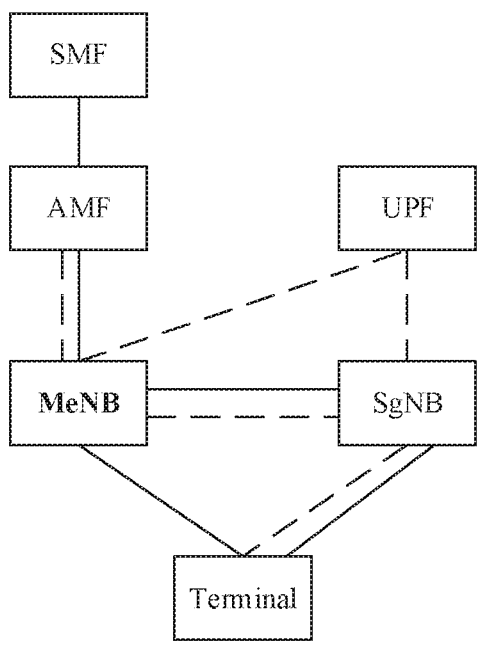
FIG. 4 is a schematic diagram of still another 5G dual connectivity architecture according to an embodiment of this application.

A third 5G dual connectivity architecture is shown in FIG. 4. A master station is an eNB in the LTE network, and the master station may be represented as a master eNB or an MeNB. The secondary station is a gNB of the 5G network, and the secondary station may be represented as a second gNB or an SgNB.

The eNB in the 5G dual connectivity architecture may be an original eNB in the LTE network, and may be referred to as a legacy eNB. The legacy eNB cannot identify a case in which 5G is upgraded compared with 4G, for example, cannot identify 5G-specific signaling.

Alternatively, the eNB in the 5G dual connectivity architecture may be an enhanced eNB adapted to the 5G network, and may be referred to as an updated eNB. Optionally, the updated eNB may identify a 5G signaling format, but may not synchronously upgrade a security protection method. Except for spectrum differences, functions of the updated eNB and the gNB are the same.

It should be noted that solid lines in FIG. 2, FIG. 3, and FIG. 4 all represent signaling plane interaction, and dashed lines all represent user plane interaction. Optionally, in FIG. 2, there may be a signaling plane connection between the SgNB and a terminal, or there may be no signaling plane connection. In FIG. 3, there may be a signaling plane connection between the SeNB and a terminal, or there may be no signaling plane connection. In FIG. 4, there may be a signaling plane connection between the SgNB and a terminal, or there may be no signaling plane connection. FIG. 2, FIG. 3, and FIG. 4 all use an example in which there is a signaling plane connection between a terminal and a secondary station for description. In addition to the master stations and the secondary stations, the foregoing three 5G dual connectivity architectures also include the following network elements:

An access and mobility management function (AMF) network element is a network element responsible for mobility management, and is configured to implement another function other than session management in mobility management entity (MME) functions, for example, functions such as lawful interception and access authorization.

A session management function (SMF) network element is configured to allocate a session resource to a user plane.

A user plane function (UPF) network element is an egress of user plane data, and is configured to connect to an external network.

A terminal stores a long-term key and a related function. When the terminal performs mutual authentication with a core network element (for example, an AMF network element in 5G, an authentication server function (AUSF) network element, a receiving security anchor function (SEAF) network element, or the like), authenticity of a network may be verified by using the long-term key and the related function.

In the 5G dual connectivity architecture, user plane data of the UPF network element needs to be sent to the terminal by using the master station and the secondary station. This embodiment of this application provides three methods for sending user plane data to a terminal, that is, three offloading types. Each offloading type may correspond to one implementation scenario.

Scenario 1: The offloading type is master station offloading, and may be referred to as a master cell group bearer (master cell group bearer, MCG bearer). A characteristic of the master station offloading is that security protection is performed by using a user plane of the master station, that is, the UPF network element sends user plane data to a master access network (MN). The MN performs security protection on the user plane data by using a user plane of the MN, and sends user plane data that needs to be forwarded by a secondary access network (SN) to the SN. In this scenario, user plane data sent by the MN and the SN to the terminal is the user plane data on which security protection is performed by using the user plane of the MN, and the terminal performs security verification on the received user plane data by using the user plane of the MN only.

It should be noted that the MN is a master station in dual connectivity or multi-connectivity. A function of the MN may be determining whether to enable a dual connectivity or multi-connectivity mode to serve a terminal device to forward data. The MN may further be a station that uniquely interacts with a core network control plane network element.

Optionally, the MN may be a 5G base station gNB, a 4G base station LTE eNB, or a 4G enhanced base station e-eNB or NR-eNB; or may be a non-3rd generation partnership project (non-3GPP) access technology, for example, a Wi-Fi access technology or a fixed network access technology; or a network element that has a gateway function and that is in the non-3GPP access technology, for example, a non-3GPP interworking function (non-3GPP interworking function, N3IWF) network element in a 5G network, or an evolved packet data gateway (evolved packaged data gateway, ePDG) in a 4G network, or a 5G fixed mobile interworking function (FMIF) accessed by a 5G fixed network.

The SN may be a 5G base station gNB or a 4G base station eNB. The eNB may be further classified into an enhanced eNB or an original eNB. The enhanced eNB may also be referred to as an updated eNB, and the original eNB may also be referred to as a legacy eNB. The enhanced eNB refers to that the eNB can identify signaling that can be identified by the 5G gNB and also has a related function of the 5G gNB. For example, the enhanced eNB supports an Xn interface, and can identify all content of the Xn interface. For another example, the enhanced eNB supports user plane integrity protection, and can identify a security policy. The SN may also be a non-3rd generation partnership project (non-3GPP) access technology, for example, a Wi-Fi access technology or a fixed network access technology; or a network element that has a gateway function and that is in the non-3GPP access technology, for example, a non-3GPP interworking function (N3IWF) network element in a 5G network, an ePDG in a 4G network, or an FMIF accessed by a 5G fixed network.

Optionally, the MN may be understood as a general term of the master station (for example, an MgNB or an MeNB), and the SN may be understood as a general term of the secondary station (for example, an SgNB or an SeNB).

Scenario 2: The offloading type is secondary-station based offloading, and may be referred to as a secondary cell group bearer (SCG bearer). A characteristic of the secondary-station based offloading is that security protection is performed by using a user plane of the secondary station, that is, the UPF network element sends user plane data to the SN. The SN performs security protection on the user plane data by using a user plane of the SN, and sends user plane data that needs to be sent by the MN to the terminal to the MN. In this scenario, user plane data sent by the MN and the SN to the terminal is the user plane data on which security protection is performed by using the user plane of the SN, and the terminal performs security verification on the received user plane data by using the user plane of the SN only.

Scenario 3: The offloading type is dual-station based offloading, and may be referred to as a split bearer (SPLIT bearer). A characteristic of the dual-station based offloading is that security protection is performed, by using the user plane of the MN on the user plane data sent by the MN to the terminal, and security protection is performed, by using the user plane of the SN, on the user plane data sent by the SN to the terminal. First, the UPF network element sends user plane data to the MN. The MN does not perform security protection on some user plane data that needs to be forwarded by the SN to the terminal, and sends the user plane data to the SN. Alternatively, the UPF network element sends user plane data to the SN, and the SN does not perform security protection on some user plane data that needs to be forwarded by the MN to the terminal, and sends the user plane data to the MN. Alternatively, the UPF network element sends user plane data that needs to be sent by the MN to the terminal to the MN, and sends user plane data that needs to be sent by the SN to the terminal to the SN. Then, the MN performs security protection on some user plane data by using the user plane of the MN, and sends the user plane data to the terminal. The SN performs security protection on some other user plane data by using the user plane of the SN, and sends the other user plane data to the terminal. Correspondingly, the terminal performs security verification on the user plane data from the MN by using the user plane of the MN, and performs security verification on the user plane data from the SN by using the user plane of the SN.

With reference to FIG. 1 to FIG. 4, an embodiment of this application provides a security protection method. The method is used to enable user plane security as required. In this embodiment of this application, a 5G network architecture is only used as an example to describe how to enable user plane security as required in a network with a dual connectivity or multi-connectivity architecture. Enabling user plane security as required means that a specific type of user plane security protection is enabled is determined based on information having an indication function. In this application, an example in which the information having an indication function is a user plane security policy is used for description. The method may be applied to a dual connectivity scenario, and may be specifically applied to a dual connectivity establishment procedure. The dual connectivity scenario includes a first access network device and a second access network device. The first access network device is the secondary station in the dual connectivity architectures in FIG. 2 to FIG. 4, and is referred to as an SN below. The second access network device is the master station in the dual connectivity architectures in FIG. 2 to FIG. 4, and is referred to as an MN below.

Figure 5:
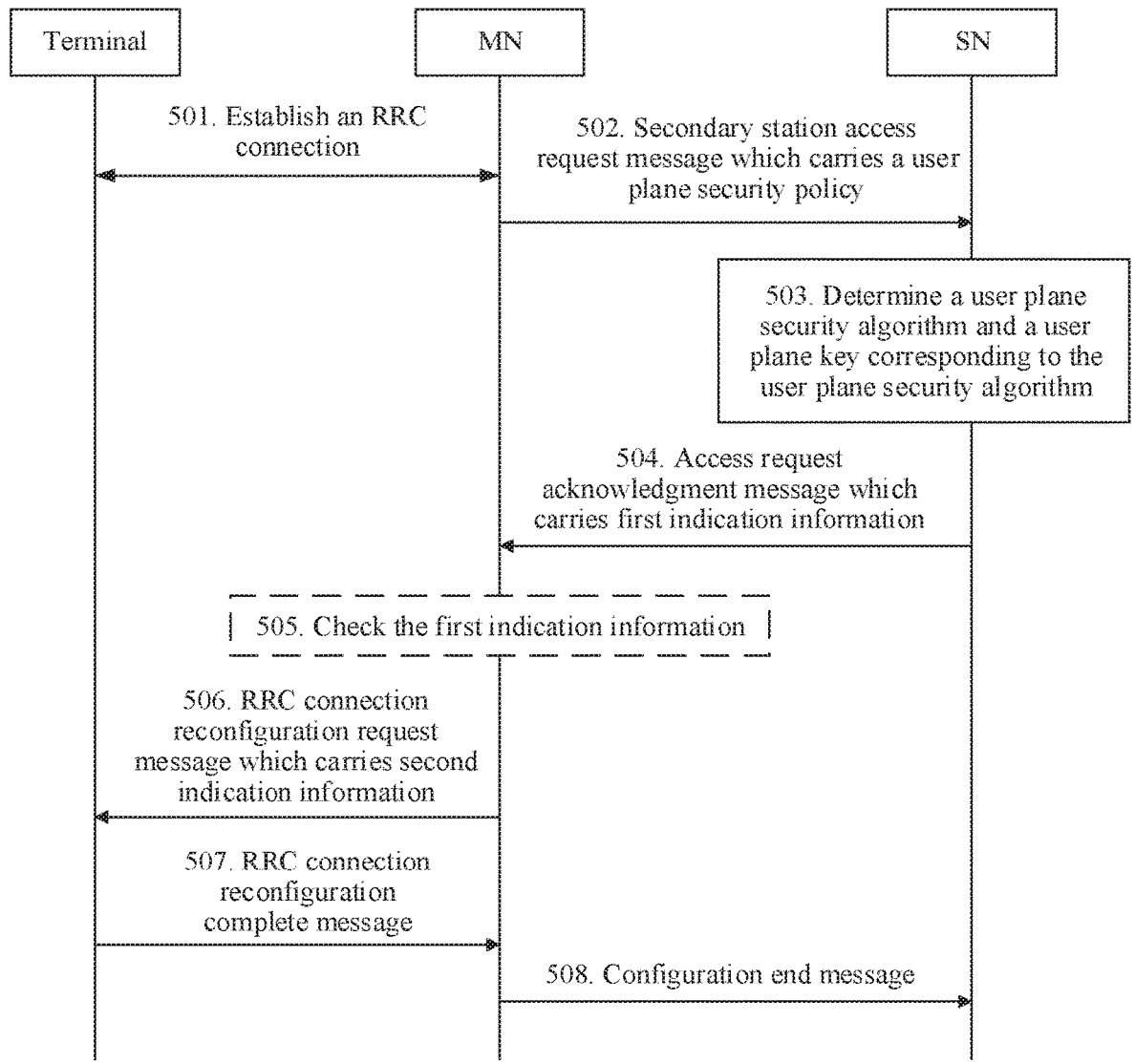
FIG. 5 is a flowchart of a security protection method according to an embodiment of this application.

In a possible implementation, the method may be applied to the foregoing scenario 2 and scenario 3. As shown in FIG. 5, the method includes the following steps.

Step 501: Establish a radio resource control (RRC) connection between the terminal and the MN.

Step 502: The MN sends a secondary station access request message to the SN. Correspondingly, the SN receives the secondary station access request message from the MN.

The secondary station access request message carries a root key used by the SN and a security capability of the terminal. Optionally, the secondary station access request message may further carry any one or more of a user plane security policy, granularity information corresponding to the user plane security policy, and an offloading type. Optionally, there may be one or more groups of user plane security policies and granularity information that corresponds to the user plane security policies. Optionally, the secondary station access request message may further carry indication information indicating whether the SN may not comply with the user plane security policy.

If the SN is an SgNB, the access request message is an SgNB addition request, the root key of the SN is an $S\text{-}K_{gNB}$, and the security capability of terminal is a 5G security capability of the terminal.

If the SN is an SeNB, the access request message is an SeNB addition request, the root key of the SN is an $S\text{-}K_{eNB}$, and the security capability of the terminal is an evolved packet system (EPS) security capability of the terminal.

If the SN is a WLAN termination (WT), the access request message is an S-WT addition request, the root key of the SN is an $S\text{-}K_{WT}$, and the security capability of the terminal is a 5G security capability of the terminal.

The security capability of the terminal includes at least a security algorithm supported by the terminal, and the security algorithm may be any symmetric algorithm or asymmetric algorithm supported by a 5G network or a future network. The security algorithm supported by the terminal includes at least a user plane security algorithm that can be used for user plane security protection.

The user plane security algorithm is a security algorithm used for user plane protection. If a security algorithm is used to protect a user plane, the security algorithm may be a user plane security algorithm. The user plane security algorithm includes one or both of a user plane encryption algorithm and a user plane integrity protection algorithm.

The user plane security policy is used to indicate a type of user plane security protection to be enabled by the SN. The type of the user plane security protection includes user plane encryption protection and user plane integrity protection. A granularity of the to-be-enabled user plane security protection is the granularity information corresponding to the security policy. To be specific, the user plane security policy is used to indicate whether the SN enables user plane encryption protection and/or whether the SN enables user plane integrity protection. The user plane security policy may be sent by an SMF network element to the MN, or may be obtained by the MN by using another method. For example, an operator may preconfigure a user plane security policy for the MN. The MN may forward, to the SN without any change, the user plane security policy sent by the SMF network element to the MN or the user plane security policy preconfigured by the operator, or may forward a user plane security policy that is in another form and that is obtained after processing. A function of the user plane security policy in another form is the same as that of the security policy sent by the SMF network element to the MN. This embodiment of this application provides the following three indication methods:

Method 1: Indicate, by using bit indication information, whether the user plane encryption protection and the user plane integrity protection are enabled.

For example, "01" indicates that the user plane encryption protection is disabled and the user plane integrity protection is enabled. "10" indicates that the user plane encryption protection is enabled and the user plane integrity protection is disabled. "11" indicates that the user plane encryption protection is enabled and the user plane integrity protection is enabled. "00" indicates that the user plane encryption protection is disabled and the user plane integrity protection is disabled.

Method 2: Indicate, by using algorithm information, whether the user plane encryption protection and the user plane integrity protection are enabled.

For example, the SN supports eight user plane encryption algorithms and eight user plane integrity protection algorithms. IDs of the eight user plane encryption algorithms are respectively EEA1 to EEA8, and IDs of the eight user plane integrity protection algorithms are respectively EIA1 to EIA8. If the user plane security policy is "EEA1, EIA7", it indicates that the SN needs to enable the user plane encryption protection and the user plane integrity protection, a used user plane encryption algorithm is EEA1 or a user plane encryption algorithm similar to EEA1, and a user plane integrity protection algorithm is EIA7 or a user plane integrity protection algorithm similar to EIA7. For example, if EEA1 represents a 128-bit user plane encryption algorithm, and EIA7 represents a 256-bit user plane integrity protection algorithm, if the SN cannot use EEA1, another 128-bit user plane encryption algorithm may be used, or if the SN cannot use EIA7, another 256-bit user plane integrity protection algorithm may be used.

In addition, optionally, EEA0 represents that the user plane encryption protection is not enabled, and EIA0 represents that the user plane integrity protection is not enabled. In another implementation method, if the user plane security policy carries only one EEA, for example, EEA1, and does not carry any EIA identifier, the user plane security policy is used to instruct to enable user plane encryption protection but not to enable user plane integrity protection. If the user plane security policy carries only one EIA, for example, EIA1, and does not carry any EEA identifier, the user plane security policy indicates not to enable user plane encryption protection but to enable user plane integrity protection.

Method 3: Indicate, by using a specific algorithm, whether the user plane encryption protection and the user plane integrity protection are enabled.

It should be noted that both method 1 and method 2 describe the user plane security policy received by the MN from the SMF network element, that is, the MN directly forwards, to the SN, the user plane security policy delivered by the SMF network element. However, in method 3, the MN determines the user plane encryption algorithm and/or the user plane integrity protection algorithm based on the user plane security policy delivered by the SMF network element, and then uses, as a security policy sent to the SN, the user plane encryption algorithm and/or the user plane integrity protection algorithm determined based on the user plane security policy that is delivered by the SMF network element.

If the user plane security policy sent by the MN to the SN includes the user plane encryption algorithm and the user plane integrity protection algorithm, the user plane security policy is used to instruct the SN to enable the user plane encryption protection and the user plane integrity protection, and use the user plane encryption algorithm and the user plane integrity protection algorithm in the user plane security policy, or a similar algorithm.

If the user plane security policy sent by the MN to the SN includes only the user plane encryption algorithm, the user plane security policy is used to instruct the SN to enable only user plane encryption protection but not to enable only user plane integrity protection, and use the user plane encryption algorithm in the user plane security policy or an algorithm similar to the user plane encryption algorithm.

If the user plane security policy sent by the MN to the SN includes only the user plane integrity protection algorithm, the user plane security policy is used to instruct the SN to enable only user plane integrity protection but not to enable only user plane encryption protection, and use the user plane integrity protection algorithm in the user plane security policy or an algorithm similar to the user plane integrity protection algorithm. The granularity information corresponding to the user plane security policy represents a granularity at which the user plane security policy can be used, and the granularity information may be any one or more of a packet data unit (PDU) session identifier, a quality of service (QoS) parameter (for example, a quality of service flow identifier (QFI)), slice information (for example, a slice identifier), 5-tuple information, and data network (DN) information.

It may be understood that if the granularity information is a PDU session identifier, it represents that the user plane security policy is applicable to this PDU session. If the granularity information is a QFI, it represents that the user plane security policy is applicable to a QoS flow corresponding to the QFI. If the granularity information is 5-tuple information, it represents that the user plane security policy is applicable to a data service flow corresponding to the 5-tuple information. If the granularity information is a slice identifier, it represents that the user plane security policy is applicable to a slice corresponding to the slice identifier. If the granularity information is DN information, the user plane security policy is applicable to a DN corresponding to the DN information. If the granularity information is slice identification information and a PDU session identifier, it represents that the user plane security policy is applicable to the PDU session in the slice.

It should be noted that there are two possible cases of a relationship between the user plane security policy and the granularity information.

Case 1: The relationship between the user plane security policy and the granularity information dynamically changes. For example, each time the SMF network element establishes a PDU session, the SMF network element sends a correspondence between the user plane security policy and the granularity information to the MN. It may be understood that in this case, the MN may send a user plane security policy and granularity information that correspond to to-be-offloaded user plane data to the SN, so that the SN performs, based on the user plane security policy and the granularity information, security protection on the to-be-offloaded user plane data. Alternatively, the MN sends a plurality of user plane security policies and granularity information corresponding to each of the user plane security policies to the SN. For example, if three PDU sessions are established between a base station and a terminal, and each PDU session corresponds to one user plane security policy, the MN sends identifiers (that is, granularity information) of the three PDU sessions and the user plane security policy corresponding to each of the PDU session identifiers to the SN.

Case 2: The relationship between the user plane security policy and the granularity information is fixed within a specified time period. For example, the granularity information corresponding to the user plane security policy is DN information, and an operator may configure and deliver the specified time period by using a network management system. If the configuration remains unchanged, the user plane security policy is applicable to a DN corresponding to the DN information within the specified time period. Alternatively, the specified time period may be determined by using a timer. Before the timer expires, a correspondence between the user plane security policy and the granularity information does not change. It may be understood that if the relationship between the user plane security policy and the granularity information is fixed within the specified time period, the MN may send the fixed relationship between the user plane security policy and the granularity information to the SN.

In addition, in the embodiment in FIG. 5, the offloading type is secondary-station based offloading or dual-station based offloading.

It should be noted that if the SN is a legacy eNB, the SN can identify only related signaling of the LTE network, and cannot identify the user plane security policy. Optionally, the SN may identify the granularity information corresponding to the user plane security policy, to establish a transmission path to the terminal based on the granularity information corresponding to the user plane security policy.

An LTE base station uses an X2 interface. Therefore, the legacy eNB is connected to the MN by using the X2 interface, or is connected to the MN by using an upgraded Xn interface. However, an Xn interface is used for interconnection between 5G base stations. To ensure that the security protection method provided in this embodiment of this application can support both a dual connectivity mode in which the SN is a legacy eNB, and a dual connectivity architecture between the 5G base stations, a possible implementation is: The Xn interface needs to be compatible with content of the X2 interface, and the Xn interface further includes a new feature other than performance of the X2 interface. The user plane security policy, the granularity information corresponding to the user plane security policy, and the offloading type that are sent by the MN to the SN need to be sent by using the new feature of the Xn interface other than the performance of the X2 interface, but cannot be sent by using the compatible content of the X2 interface. In this way, the legacy eNB discovers that all signaling is known. It should be noted that, in this embodiment of this application, the Xn interface and the X2 interface are used as examples for description. Alternatively, the Xn interface may be replaced with another new interface in the 5G network, and the X2 interface may be replaced with an old interface that is in LTE and that is not adapted to the 5G network.

Optionally, after receiving the secondary station access request message, a part of content in the access request message cannot be identified by the legacy eNB, and the legacy eNB may delete or reserve the unidentified part of content in the message. The other part of content in the access request message can be identified and reserved by the legacy eNB. Optionally, some or all of the user plane security policy, the granularity information corresponding to the user plane security policy, and the offloading type are placed in a part that can be reserved by the legacy eNB and that is in the secondary station access request message. In this way, in another scenario, for example, in a process of handover of a serving base station of the terminal, the legacy eNB may continue to transfer any one or more of the user plane security policy, the granularity information corresponding to the user plane security policy, and the offloading type.

For example, if the first 16 bits in the access request message are definitely stored by the legacy eNB, and only the first to the eighth bits can be identified by the legacy eNB, the user plane security policy, the granularity information corresponding to the user plane security policy, and the offloading type may be carried in the ninth to the sixteenth bits in the access request message.

Step 503: The SN determines a user plane security algorithm.

Optionally, the SN may determine the user plane security algorithm based on the user plane security policy. Optionally, the SN may further determine a user plane key corresponding to the user plane security algorithm.

Specifically, in an implementation, the SN may determine, based on a received security capability of the terminal and a preconfigured algorithm priority list, a set of security algorithms that are supported by the terminal device and that have a highest priority. The set of security algorithms can be used for both signaling plane protection and user plane protection. The security algorithms determined by the SN include at least one encryption algorithm and one integrity protection algorithm. After receiving the user plane security policy, the SN determines the user plane security algorithm based on the user plane security policy. For example, if the user plane security policy instructs to enable the user plane integrity protection but not to enable the user plane encryption protection, the SN protects user plane data by using the determined integrity protection algorithm, and does not protect the user plane data by using the determined encryption algorithm.

In another implementation, the SN may determine, based on the user plane security policy, a set of algorithms used only for user plane security protection. For example, the SN selects a user plane security algorithm based on the security capability of the terminal and a preconfigured security algorithm or a preconfigured user plane security algorithm set. The preconfigured security algorithm or the preconfigured user plane security algorithm set may exist in a form of a priority list, and the preconfigured security algorithm or algorithms in the preconfigured user plane security algorithm set are sorted in descending order of priorities. The preconfigured user plane security algorithm set in the SN includes a user plane encryption algorithm set and a user plane integrity protection algorithm set.

When receiving the user plane security policy, the SN may select a user plane security algorithm based on the user plane security policy, the security capability of the terminal, and a preconfigured security list.

For example, if the user plane security policy does not carry a specific algorithm and is used only to indicate a type of a security algorithm that is enabled or not, the SN determines whether to enable the user plane encryption protection and the user plane integrity protection based on the user plane security policy. For example, if the user plane security policy instructs to enable the user plane encryption protection but not to enable the user plane integrity protection, the SN determines a user plane encryption algorithm based on the security capability of the terminal and a preconfigured encryption algorithm or a preconfigured user plane encryption protection algorithm set, and determines a user plane encryption key based on the determined user plane encryption algorithm, without a need to determine a user plane integrity protection algorithm and a user plane integrity protection key.

Optionally, if a user plane and a signaling plane share one set of security algorithms, the SN may determine, based on the user plane security policy, the type of the user plane security protection that needs to be enabled, and then use, as the user plane security algorithm, a signaling plane security algorithm corresponding to the type of the user plane security protection that needs to be enabled. For example, if the user plane security policy instructs to enable the user plane encryption protection but not to enable the user plane integrity protection, the SN may use a signaling plane encryption algorithm and a signaling plane encryption key as the user plane encryption algorithm and the user plane encryption key.

Optionally, if the access request message received by the SN carries indication information indicating that the SN needs to comply with the user plane security policy, the SN needs to determine the user plane security algorithm based on the user plane security policy and determine the user plane key corresponding to the user plane security algorithm. If the SN cannot perform user plane security protection based on the security policy (for example, the SN is overloaded, or the SN does not have a hardware condition for performing user plane encryption protection or user plane integrity protection), the SN returns a reject message to the MN. Optionally, the reject message carries a reject cause value.

If the access request message received by the SN does not carry indication information indicating whether the SN may not comply with the user plane security policy, the SN performs user plane security protection based on the user plane security policy by default. If the SN cannot perform user plane security protection based on the security policy, the SN may select a user plane security algorithm based on a default user plane security policy, and determine a user plane key corresponding to the user plane security algorithm. The default user plane security policy may be a user plane security protection method preconfigured by an operator or specified in a standard protocol. For example, a default user plane security policy corresponding to the legacy eNB is enabling user plane encryption protection and not enabling user plane integrity protection. For another example, for a 5G N3IWF, a default user plane security policy is performing security protection on user plane data by using internet protocol security (IPsec).

Step 504: The SN sends an access request acknowledgment message to the MN. Correspondingly, the MN receives the access request acknowledgment message from the SN.

If the SN is an SgNB, the access request acknowledgment message is SgNB addition request acknowledge. If the SN is an SeNB, the access request acknowledgment message is SeNB addition request acknowledge. If the SN uses another type of access technology, the access request acknowledgment message is a reply message in a corresponding procedure.

The access request acknowledgment message carries any one or more of the user plane security algorithm selected by the SN, first indication information, granularity information corresponding to the first indication information, and a user plane key generation parameter. The first indication information is used to indicate a type of user plane security protection to be enabled by the terminal. It may be understood that the type that is of the user plane security protection to be enabled by the terminal and that is indicated by the first indication information is the same as a type of user plane security protection enabled by the SN. Optionally, the type that is of the user plane security protection to be enabled by the terminal and that is indicated by the first indication information may be the same as or different from the type that is of the user plane security protection to be enabled by the SN and that is indicated by the user plane security policy. Specifically, if the SN enables user plane security protection based on the user plane security policy, the type that is of the user plane security protection to be enabled by the terminal and that is indicated by the first indication information is the same as the type that is of the user plane security protection to be enabled by the SN and that is indicated by the user plane security policy; or if the SN does not enable user plane security protection based on the user plane security policy, the type that is of the user plane security protection to be enabled by the terminal and that is indicated by the first indication information may be different from the type that is of the user plane security protection to be enabled by the SN and that is indicated by the user plane security policy.

Optionally, if the signaling plane security algorithm is different from the user plane security algorithm, the first indication information may be a user plane protection algorithm selected by the SN. If the signaling plane security algorithm is the same as the user plane security algorithm, the first indication information is used to instruct the terminal whether to enable user plane encryption protection and user plane integrity protection. For example, if the first indication information instructs to enable user plane encryption protection and user plane integrity protection, the terminal may use a signaling plane encryption algorithm as the user plane encryption algorithm and use a signaling plane integrity protection algorithm as the user plane integrity protection algorithm.

Optionally, if a standard specifies that the SN does not need to send the first indication information to the MN, or if the SN is a legacy eNB, the SN does not need to send the first indication information and the granularity information corresponding to the first indication information to the MN.

Step 505: The MN checks the first indication information.

Optionally, step 505 may not be performed. When step 505 is not performed, the MN determines the first indication information as second indication information, and performs step 506. This may also be understood as that the MN forwards the received first indication information to the terminal.

Optionally, when step 505 is performed, if the SN is a legacy eNB, step 505 may be implemented in the following manner 1. If the SN is an SgNB or an updated eNB, step 505 may be implemented in the following manner 2.

Manner 1: The MN checks whether the first indication information from the SN is received. If the MN receives the first indication information from the SN, the MN determines the first indication information as the second indication information. If the MN does not receive the first indication information from the SN, the MN determines whether the SN is a legacy eNB based on the received access request acknowledgment message. Specifically, if the access request acknowledgment message does not carry any 5G-related information, the MN may determine that the SN is a legacy eNB, or if the access request acknowledgment message carries indication information used to indicate that the SN is a legacy eNB (for example, bit information is used for indication, and if the bit information is 1, it indicates the SN is a legacy eNB), the MN may determine that the SN is a legacy eNB. When the SN is determined as a legacy eNB, the MN may check the user plane security policy.

If a user plane security protection method defaulted by a legacy eNB based on a current configuration of an operator is enabling user plane encryption protection and not enabling user plane integrity protection, the user plane security policy is enabling user plane encryption protection and not enabling user plane integrity protection. It indicates that the user plane security policy is consistent with the user plane security protection method defaulted by the legacy eNB. In this case, the MN may generate the second indication information based on the user plane security policy, where the second indication information is used to instruct the terminal to enable user plane encryption protection but not to enable user plane integrity protection.

Optionally, if the MN determines that the user plane security policy is not enabling user plane encryption protection but enabling user plane integrity protection, the MN may reject access of the SN. Optionally, after rejecting the access of the SN, the MN may reselect a base station as the secondary station.

Alternatively, if the MN determines that the user plane security policy is not enabling user plane encryption protection and enabling user plane integrity protection, the MN may modify the user plane security policy to enabling user plane encryption protection and not enabling user plane integrity protection, and generate the second indication information based on a modified user plane security policy, so that a type of security protection enabled by the terminal is consistent with the type of security protection enabled by the SN. The second indication information is used to instruct the terminal to enable user plane encryption protection but not to enable user plane integrity protection. It should be noted that an effective time of the modified user plane security policy is a time period in which the SN is accessed, or before the SMF network element delivers a new user plane security policy.

Manner 2: The MN determines whether the first indication information is allowed to be inconsistent with the user plane security policy. If the first indication information is allowed to be inconsistent with the user plane security policy, the first indication information is used as the second indication information. If not allowed, the MN determines whether the received first indication information is consistent with the user plane security policy. If the received first indication information is consistent with the user plane security policy, the MN uses the first indication information as the second indication information. If inconsistent, the MN rejects access of the SN. Optionally, after rejecting the access of the SN, the MN may reselect a base station as the secondary station to re-establish a dual connectivity procedure.

Step 506: The MN sends an RRC connection reconfiguration request message to the terminal, and correspondingly, the terminal receives the RRC connection reconfiguration request message from the MN.

The RRC connection reconfiguration request message carries the second indication information, and the second indication information is used to indicate the type of the user plane security protection to be enabled by the terminal.

Step 507: The terminal sends an RRC connection reconfiguration complete message to the MN. Correspondingly, the MN receives the RRC connection reconfiguration complete message from the terminal.

The RRC connection reconfiguration complete message may be an RRC connection reconfiguration response, and the RRC connection reconfiguration complete message carries the second indication information and granularity information corresponding to the second indication information. Optionally, the RRC connection reconfiguration complete message further carries the user plane security algorithm determined by the SN or a user plane security algorithm determined by the MN for the terminal.

It should be noted that the RRC connection reconfiguration complete message may further carry information such as a generation parameter used to generate a user plane security key, and refer to the prior art. Details are not described herein.

Step 508: The MN sends a configuration end message to the SN. Correspondingly, the SN receives the configuration end message from the MN.

If the SN is an SgNB, the configuration end message is SgNB reconfiguration complete.

If the SN is an SeNB, the configuration end message is SeNB reconfiguration complete.

According to the method, the master station may send the user plane security policy to the secondary station, so that the secondary station determines a type of enabled user plane protection based on the user plane security policy, to enable user plane security as required. In addition, the SN may determine, based on the security policy, a user plane key that needs to be generated, and does not need to first generate a user plane and then determine whether the user plane needs to be used, thereby reducing processing overheads of the SN.

Optionally, with reference to an embodiment in FIG. 5, in another possible implementation, if the MN is a legacy eNB, the legacy eNB cannot store the user plane security policy. In this case, the secondary station access request message sent by the MN to the SN does not carry the user plane security policy, the granularity information corresponding to the user plane security policy, or the offloading type. After receiving the access request message from the MN, the SN selects to enable a default user plane security protection type, and determines a user plane security algorithm and a user plane key that correspond to the default user plane security protection type. The default user plane security protection type is user plane encryption protection. It should be noted that the SN may use enabling user plane encryption protection and not enabling user plane integrity protection as a default user plane security policy. Then, the SN may send a selected user plane encryption algorithm to the terminal by using the MN, to implement security protection on data transmitted between the SN and the terminal.

With reference to the procedure shown in FIG. 5, the following separately describes, for each offloading type, the security protection method provided in the embodiments of this application.

In a possible implementation scenario, corresponding to the foregoing scenario 1, if the offloading type is master station offloading, in step 502, the secondary station access request message carries the offloading type, the root key of the SN, and the security capability of the terminal. The offloading type is master station offloading. After determining that the offloading type is master station offloading, the SN may determine that the master station may perform security protection on user plane data from the UPF network element. Then the SN does not need to determine a user plane security algorithm and a user plane key that are used to perform security protection on the user plane data from the UPF network element.

Optionally, in a possible implementation, the secondary station access request message does not carry the user plane security policy and or granularity information corresponding to the user plane security policy.

In another possible implementation, the secondary station access request may carry the user plane security policy and the granularity information corresponding to the user plane security policy. In this manner, it can be ensured that signaling messages in a dual connectivity establishment process are consistent regardless of the offloading type. In addition, when the offloading type is master station offloading, the receiving, by the SN, the user plane security policy may further prevent the following case: In a process of master station offloading, when the MN changes the offloading type from master station offloading to secondary-station based offloading or dual offloading for a reason, and the MN has not sent or re-sent the user plane security policy to the SN, the SN may determine the user plane security algorithm based on the received user plane security policy, determine the user plane key corresponding to the user plane security algorithm, and further negotiate with the terminal to activate user plane security protection that is enabled by indication of the user plane security policy. This ensures security of user plane data after the offloading type changes.

It should be noted that the secondary station access request message does not carry the user plane security policy or the granularity information corresponding to the user plane security policy.

In step 503, the SN may select the user plane security algorithm based on the security capability of the terminal and the preconfigured user plane security algorithm set, and send the selected user plane security algorithm to the terminal by using step 504 and step 506.

It may be understood that in this scenario, step 505 does not need to be performed, step 504 does not carry the first indication information, and step 506 does not carry the second indication information. In step 503, the SN does not need to select a user plane security algorithm. Correspondingly, after completing a 5G dual connectivity establishment procedure, the terminal performs security verification on the user plane data received from the MN and the SN by using the user plane of the MN.

It should be noted that for other steps, refer to the descriptions in the embodiment in FIG. 5, and details are not described herein again.

In another possible implementation scenario, corresponding to the foregoing scenario 2, if the offloading type is secondary-station based offloading, in step 502, the secondary station access request further carries the offloading type, and the offloading type is secondary-station based offloading.

In step 503, the SN may determine, based on the user plane security policy, the user plane security algorithm and the user plane key corresponding to the user plane security algorithm. For a specific determining method, refer to related descriptions in step 503.

Optionally, in step 503, the SN may further ignore the received security policy, select to enable the default user plane security protection type, and determine the user plane security algorithm and the user plane key that correspond to the default user plane security protection type.

In step 504, the type of the user plane security protection to be enabled by the terminal indicated by the first indication information is the same as the type of the user plane security protection enabled by the SN.

It may be understood that in this scenario, step 505 does not need to be performed, and the second indication information in step 506 is the same as the first indication information in step 504. Correspondingly, after completing the 5G dual connectivity establishment procedure, the terminal performs security verification on the user plane data received from the MN and the SN by using the user plane of the SN.

It should be noted that for other steps, refer to the descriptions in the embodiment in FIG. 5, and details are not described herein again.

In still another possible implementation scenario, corresponding to the foregoing scenario 3, if the offloading type is dual-station based offloading, in step 502, the secondary station access request further carries the offloading type, and the offloading type is dual-station based offloading.

Optionally, if the SN definitely performs based on the user plane security policy by default, in step 504, the access request acknowledgment message may not carry the first indication information, and in step 505, the MN generates the second indication information based on the user plane security policy.

Optionally, if the SN does not necessarily perform according to the user plane security policy by default, in step 504, the access request acknowledgment message carries the first indication information, and step 505 is implemented in manner 2 described in step 505.

Correspondingly, after completing the 5G dual connectivity establishment procedure, the terminal performs security verification on the user plane data received from the MN by using the user plane of the MN, and performs security verification on the user plane data received from the SN by using the user plane of the SN.

It should be noted that for other steps, refer to the descriptions in the embodiment in FIG. 5, and details are not described herein again.

Figure 6:
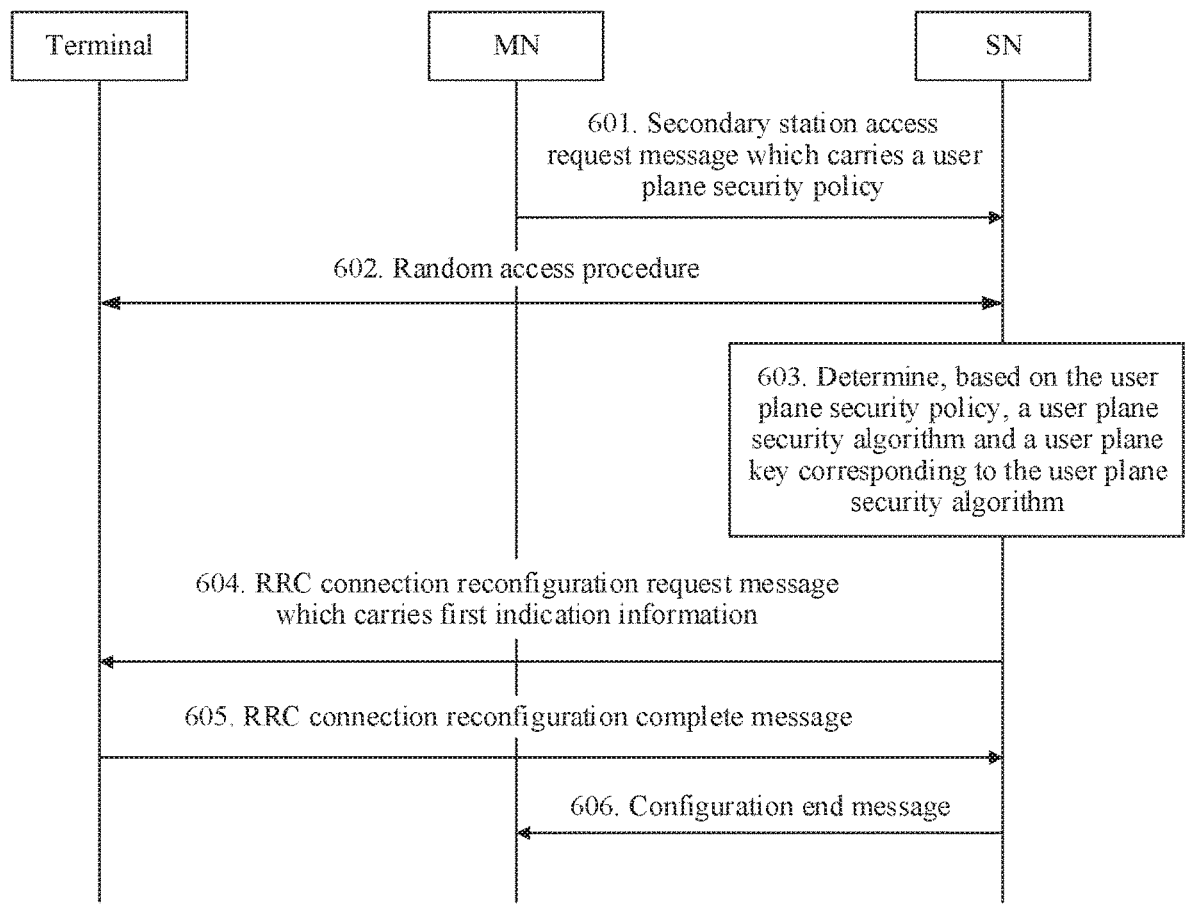
FIG. 6 is a flowchart of another security protection method according to an embodiment of this application.

With reference to FIG. 1 to FIG. 4, in another possible implementation, the method may be applied to the foregoing scenario 2 and scenario 3, and the SN may further directly negotiate a user plane security algorithm with the terminal. As shown in FIG. 6, the method includes the following steps.

Step 601: The MN sends a secondary station access request message to the SN. Correspondingly, the SN receives the secondary station access request message from the MN.

Step 601 is the same as step 502. For details, refer to related descriptions in step 502. Details are not described herein again.

Step 602: The terminal performs a random access procedure with the SN.

Step 603: The SN determines, based on a user plane security policy, a user plane security algorithm and a user plane key corresponding to the user plane security algorithm.

For a method for determining, by the SN based on the user plane security policy, the user plane security algorithm and the user plane key corresponding to the user plane security algorithm, refer to related descriptions in step 503. Details are not described herein again.

Step 604: The SN sends an RRC connection reconfiguration request message to the terminal, and correspondingly, the terminal receives the RRC connection reconfiguration request message from the SN.

The RRC connection reconfiguration request message carries any one or more of the user plane security algorithm selected by the SN, first indication information, and granularity information corresponding to the first indication information. The first indication information is used to indicate a type of user plane security protection to be enabled by the terminal. It may be understood that the type of the user plane security protection to be enabled by the terminal indicated by the first indication information is the same as a user plane security protection type enabled by the SN.

Optionally, after the SN determines the user plane security algorithm and before the SN sends the RRC connection reconfiguration request message to the terminal, the terminal and the SN may send the user plane security algorithm determined by the SN to the terminal by using an access stratum (AS) security mode command (SMC) procedure. Optionally, the user plane security algorithm determined by the SN is also applicable to a signaling plane. In other words, the SN and the terminal may use the security algorithm that is determined by the SN and that is transferred in the AS SMC as a signaling plane security algorithm and use the security algorithm that is determined by the SN and that is transferred in the AS SMC for the user plane security algorithm.

Step 605: The terminal sends an RRC connection reconfiguration complete message to the SN. Correspondingly, the SN receives the RRC connection reconfiguration complete message from the terminal.

The RRC connection reconfiguration complete message is an RRC connection reconfiguration response.

Step 606: The SN sends a configuration end message to the MN. Correspondingly, the MN receives the configuration end message from the SN.

Figure 7:
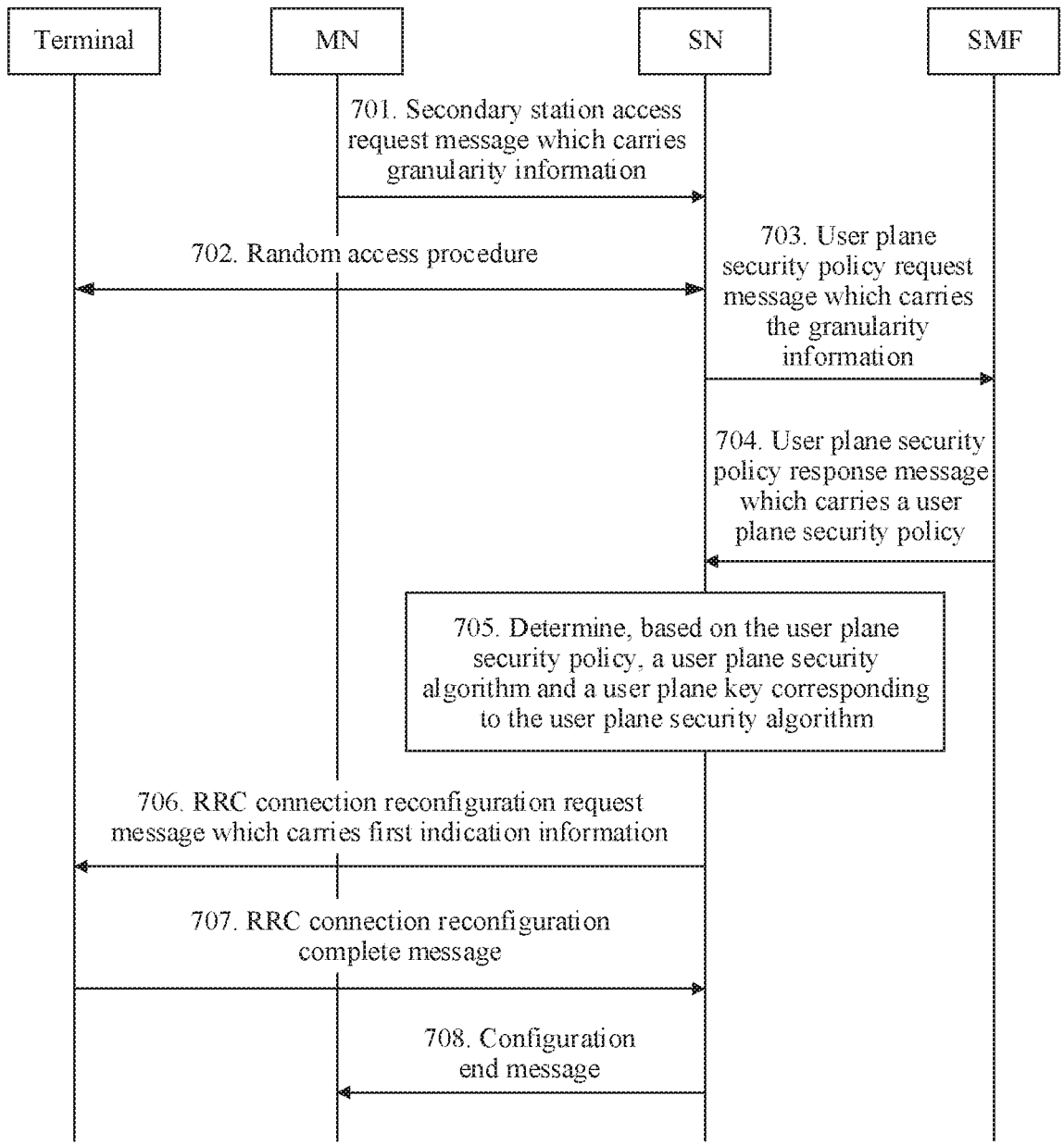
FIG. 7 is a flowchart of another security protection method according to an embodiment of this application.

With reference to the embodiment corresponding to FIG. 6, in still another possible implementation, the method may be applied to the foregoing scenario 2 and scenario 3. The SN may directly negotiate a user plane security algorithm with the terminal, and the SN may obtain a user plane security policy from the SMF. As shown in FIG. 7, the method includes the following steps.

Step 701: The MN sends a secondary station access request message to the SN. Correspondingly, the SN receives the secondary station access request message from the MN.

The secondary station access request message does not carry a user plane security policy, but may carry granularity information corresponding to a user plane security policy.

For other information carried in the secondary station access request message, refer to related descriptions in step 501. Details are not described herein again.

Optionally, when the MN does not store the user plane security policy or the MN is a legacy eNB, the secondary station access request message may not carry the user plane security policy.

Step 702: The terminal performs a random access procedure with the SN.

Step 703: The SN sends a user plane security policy request message to the SMF network element. Correspondingly, the SMF network element receives the user plane security policy request message from the SN.

The user plane security policy request message carries the granularity information corresponding to the user plane security policy.

Optionally, the SN may send the user plane security policy request message to the AMF network element, and then the AMF network element forwards the user plane security policy request message to the SMF network element.

Step 704. The SMF network element sends a user plane security policy response message to the SN. Correspondingly, the SN receives the user plane security policy response message from the SMF network element.

The user plane security policy response message carries a user plane security policy, and the user plane security policy is the user plane security policy corresponding to the granularity information carried in the user plane security policy request message.

Optionally, the SMF network element may send the user plane security policy response message to the AMF network element, and then the SMF network element forwards the user plane security policy response message to the SN.

Step 705: The SN determines, based on the user plane security policy, a user plane security algorithm and a user plane key corresponding to the user plane security algorithm.

For a method for determining, by the SN based on the user plane security policy, the user plane security algorithm and the user plane key corresponding to the user plane security algorithm, refer to related descriptions in step 503.

Step 706 to step 708 are the same as step 604 to step 606, and details are not described herein again.

Figure 8:
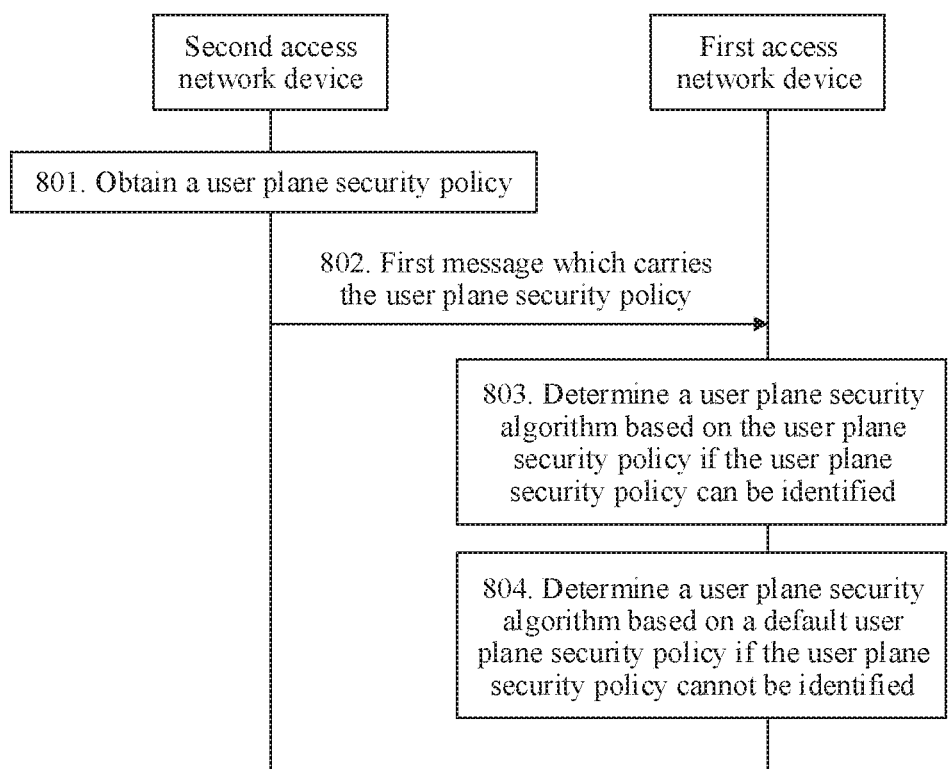
FIG. 8 is a flowchart of another security protection method according to an embodiment of this application.

With reference to the foregoing embodiment described for a specific scenario, an embodiment of this application provides a security protection method. The method is applied to a dual connectivity scenario. The dual connectivity scenario includes a first access network device and a second access network device. The first access network device is a secondary station in the dual connectivity, and the second access network device is a master station in the dual connectivity. Optionally, the first access network device may be the SN in the foregoing embodiment, and the second access network device may be the MN in the foregoing embodiment, as shown in FIG. 8, the method includes the following steps.

Step 801. The second access network device obtains a user plane security policy.

The user plane security policy is used to indicate a type of user plane security protection to be enabled by the first access network device. For related descriptions of the user plane security policy, refer to step 502.

Optionally, the SMF network element may send the user plane security policy to the second access network device by using the AMF network element, so that the second access network device obtains the user plane security policy.

Step 802: The second access network device sends a first message to the first access network device. Correspondingly, the first access network device receives the first message from the second access network device.

The first message carries the user plane security policy and first granularity information, and the first granularity information is granularity information corresponding to the user plane security policy. Optionally, the first message further carries an offloading type, and the offloading type carried in the first message may be secondary-station based offloading or dual-station based offloading.

Optionally, the first message may be the secondary station access request message in step 502. For details, refer to the foregoing descriptions about the secondary station access request message.

Step 803. If the first access network device can identify the user plane security policy, the first access network device determines a user plane security algorithm based on the user plane security policy.

Optionally, the first access network device may further generate a user plane key corresponding to the user plane security algorithm.

It may be understood that if the first access network device can identify the type of the to-be-enabled user plane security protection, it indicates that the first access network device is an SgNB or an updated eNB. The first access network device may determine, based on the method described in step 503, the user plane security algorithm and the user plane key corresponding to the user plane security algorithm.

Step 804. If the first access network device cannot identify the user plane security policy, the first access network device determines a user plane security algorithm based on a default user plane security policy.

Optionally, the first access network device may further generate a user plane key corresponding to the user plane security algorithm.

It may be understood that if the first access network device cannot identify the user plane security policy, it indicates that the first access network device is a legacy eNB. In this case, the legacy eNB enables, by default, user plane encryption protection and does not enable user plane integrity protection based on an operator configuration. The default user plane security policy is used to instruct the first access network device to enable user plane encryption protection but not to enable user plane integrity protection.

According to the security protection method provided in this embodiment of this application, when the secondary station can identify the user plane security policy from the master station, the secondary station may determine the user plane security algorithm based on the user plane security policy from the master station, to enable the user plane security algorithm as required. If the secondary station cannot identify the user plane security policy from the master station, the secondary station may further determine the user plane security algorithm based on the default user plane security policy, and this ensures security of user plane data transmitted between the secondary station and the terminal.

In addition, when the secondary station can identify the user plane security policy from the master station, the master station and the secondary station determine the user plane security algorithm by using a same user plane security policy, and the user plane security algorithm determined by the master station and the secondary station is also applicable to a same granularity. When dual-station based offloading is used, the master station and the secondary station perform security protection on user plane data at a same granularity by using a same type of user plane security algorithm. Therefore, a case in which the terminal needs to perform security verification on the user plane data at the same granularity by using different types of user plane security algorithms does not occur, and complexity of terminal processing does not increase.

Figure 9:
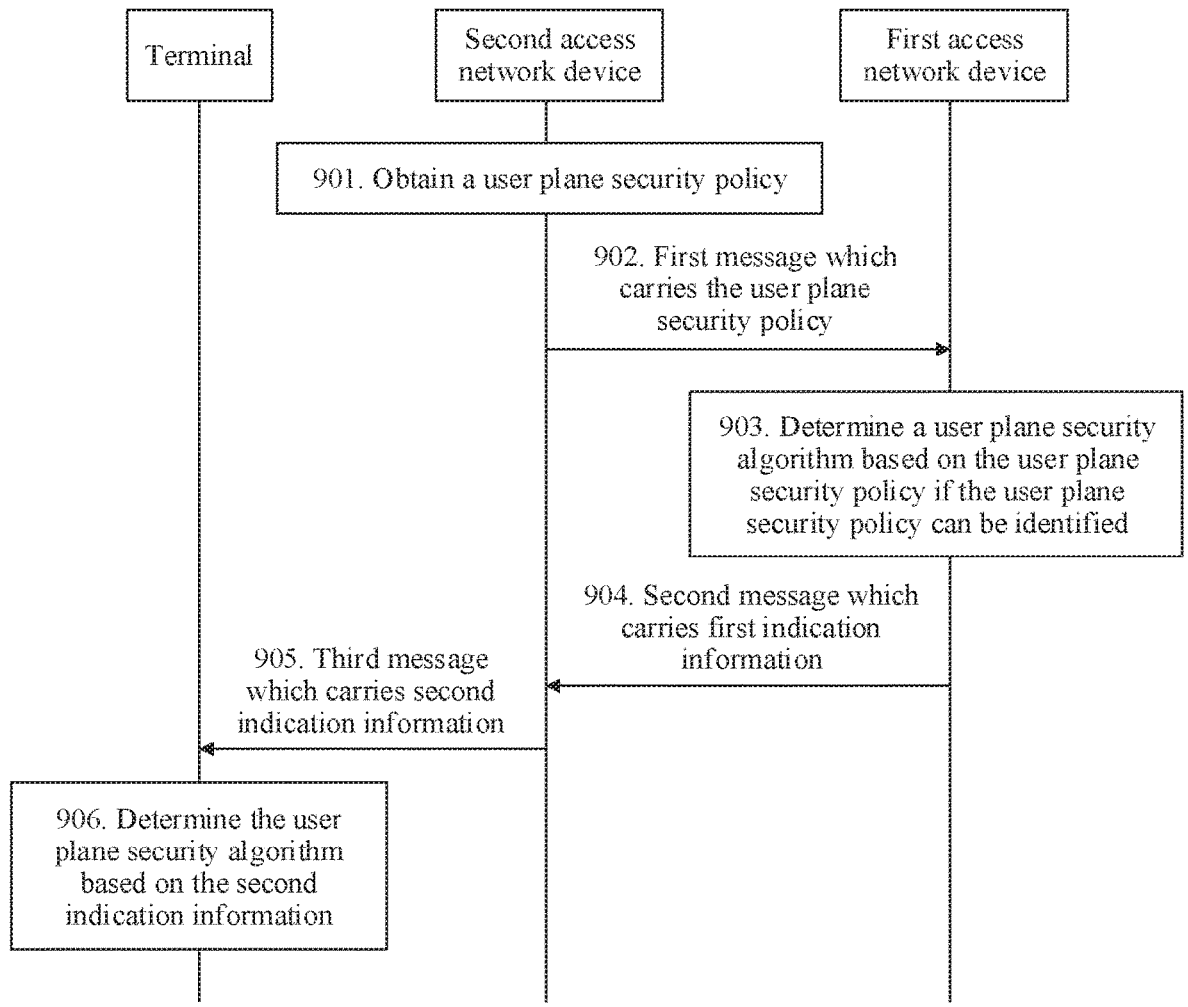
FIG. 9 is a flowchart of another security protection method according to an embodiment of this application.

Optionally, based on the embodiment in FIG. 8, after determining the user plane security algorithm based on the user plane security policy from the second access network device, the first access network device further needs to instruct the terminal to enable a same user plane security protection type. Based on this, in another implementation of the embodiments of this application, as shown in FIG. 9, the method includes the following steps.

Step 901 to step 903 are the same as step 801 to step 803, and details are not described herein again.

Step 904. The first access network device sends a second message to the second access network device. Correspondingly, the second access network device receives the second message from the first access network device.

The second message is a response message for the first message, the second message carries first indication information, and the first indication information is used to indicate a type of user plane security protection to be enabled by the terminal. An indication method of the first indication information may be any one of method 1 to method 3 in step 502.

It should be noted that the type of the user plane security protection to be enabled by the terminal indicated by the first indication information is a user plane security protection type actually enabled by the first access network device. Because the first access network device may not determine a user plane security algorithm based on a user plane security policy from the second access network device, a type of user plane security protection to be enabled by the first access network device indicated by the user plane security policy may be different from the type of the user plane security protection to be enabled by the terminal indicated by the first indication information. Optionally, if the first access network device determines the user plane security algorithm based on the user plane security policy from the second access network device, the type of the user plane security protection to be enabled by the first access network device indicated by the user plane security policy is the same as the type of the user plane security protection to be enabled by the terminal indicated by the first indication information.

Optionally, the second message further carries one or both of the user plane security algorithm determined by the first access network device and second granularity information, and the second granularity information is granularity information corresponding to the first indication information.

The second granularity information may be the same as or different from first granularity information. For example, a base station may associate the second granularity information with the first granularity information. For example, the second granularity information may be a data resource bearer (DRB), and may be represented by a DRB ID. The first granularity information is a PDU session identifier, and a plurality of DRB IDs correspond to one PDU session identifier. For another example, the first granularity information is QFI information, the second granularity information is a DRB ID, and one DRB ID may correspond to a plurality of QFIs. For another example, the first granularity information is a DRB, that is, the first message further carries a DRB ID, and the second granularity information is still a DRB. However, the first access network device may select, based on an offloading type, to allocate a new DRB ID to the terminal. In other words, although both the first granularity information and the second granularity information are DRBs, the first granularity information and the second granularity information correspond to different DRB IDs. Alternatively, the first access network device may continue to use the DRB ID in the first message that is sent by the second access network device, that is, the DRB ID corresponding to the first granularity information is the same as the DRB ID corresponding to the second granularity information.

Step 905: The second access network device sends a third message to the terminal. Correspondingly, the terminal receives the third message from the second access network device.

The third message carries second indication information, and the second indication information is used to indicate the type of the user plane security protection to be enabled by the terminal. An indication method of the second indication information may be any one of method 1 to method 3 in step 502.

It should be noted that indication methods used by the first indication information, the second indication information, and the user plane security policy in step 801 may be the same, or may be the same in every two, or may be different in all. For example, indication methods of the first indication information, the second indication information, and the user plane security policy all use method 2 in step 502. Alternatively, an indication method of the user plane security policy is method 2 in step 502, and indication methods of both the first indication information and the second indication information are method 1 in step 502. Alternatively, an indication method of the user plane security policy is method 1 in step 502, an indication method of the first indication information is method 2 in step 502, and an indication method of the second indication information is method 3 in step 502.

Before sending the third message to the terminal, the second access network device needs to determine the second indication information.

Optionally, if the second access network device has determined that the offloading type is secondary-station based offloading, the second access network device may use the first indication information as the second indication information, and it may also be understood that the second access network device forwards the received first indication information to the terminal. Alternatively, it may be understood that after processing the first indication information, the second access network device forwards the processed first indication information (the processed first indication information is the second indication information) to the terminal. In other words, the second indication information and the first indication information indicate same content, but indication methods may be different. For example, the indication method of the first indication information is method 1 in step 502, and the indication method of the second indication information is method 2 in step 502.

Optionally, the second access network device may check whether the first indication information is allowed to be inconsistent with the user plane security policy. If not allowed, the second access network device further determines whether the first indication information is consistent with the user plane security policy.

If the first indication information is consistent with the user plane security policy, the second access network device determines the first indication information as the second indication information.

Alternatively, if the first indication information is inconsistent with the user plane security policy, the second access network device rejects access of the first access network device. Optionally, after rejecting access of the SN, the MN may reselect a base station as the secondary station.

Step 906: The terminal determines a user plane security algorithm based on the second indication information.

Optionally, the terminal may further generate a user plane key based on the user plane security algorithm, or the terminal reuses a generated user plane key.

For example, if the second indication information instructs to enable user plane encryption protection but not to enable user plane security protection, the terminal determines a user plane encryption algorithm, and generates a user plane encryption key based on the user plane encryption algorithm. If the terminal protects a same user plane key used by all user plane data, and the terminal has previously generated a user plane key for another service, the terminal only needs to determine to select a reused user plane key based on the second indication information.

For example, if the second indication information is a specific user plane encryption algorithm and a specific user plane integrity protection algorithm, the terminal generates a user plane encryption key based on the user plane encryption algorithm indicated by the second indication information, and generates a user plane integrity protection key based on the user plane integrity protection algorithm indicated by the second indication information.

According to the security protection method provided in this embodiment of this application, after determining the user plane security algorithm, the first access network device further needs to instruct the terminal to enable a same user plane security protection type, and determine the user plane key by using a user plane security algorithm same as that of the first access network device. Therefore, the terminal can perform security protection on user plane data on which security protection is performed by using the first access network device, and the terminal can successfully perform security verification on received user plane data. On a premise that user plane security protection of the first access network device is enabled as required, a success rate of security verification performed by the terminal on the received user plane data is ensured.

Figure 10:
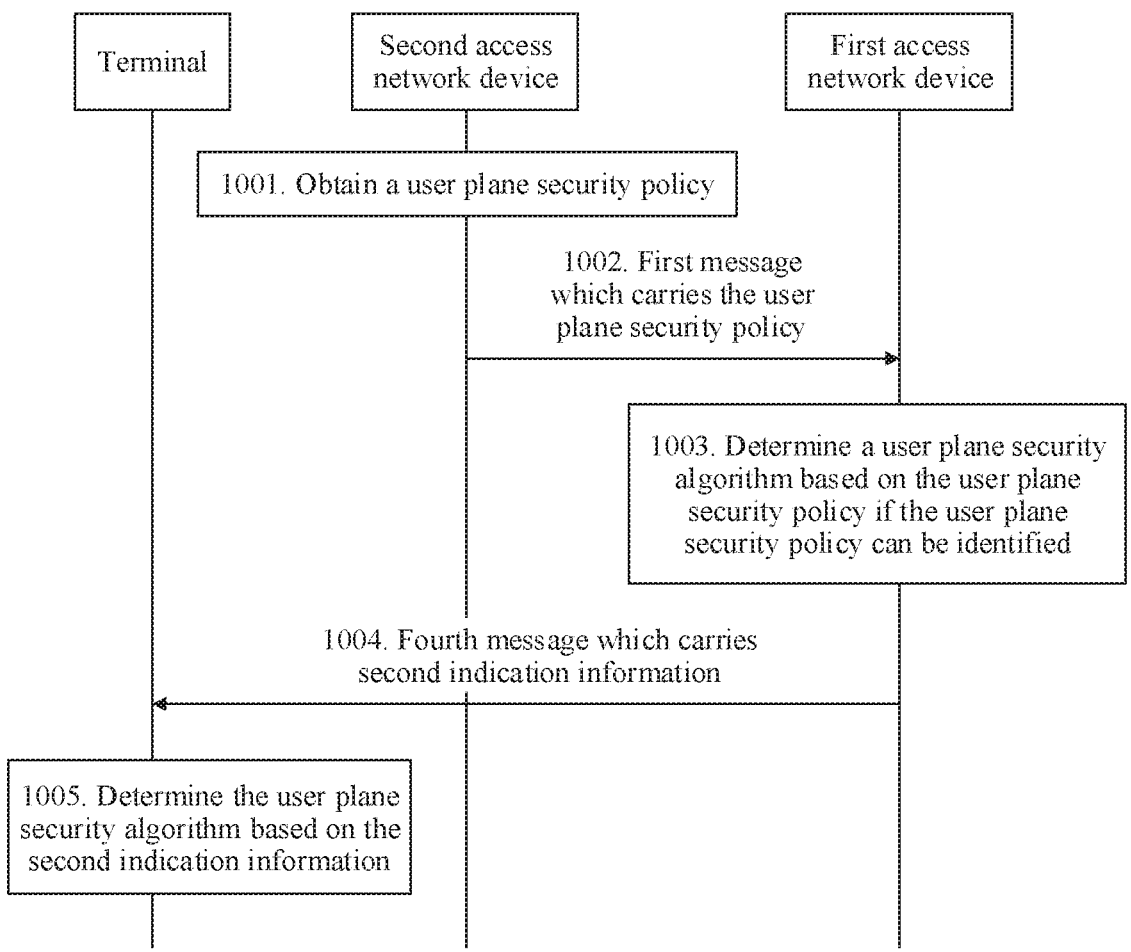
FIG. 10 is a flowchart of another security protection method according to an embodiment of this application.

Optionally, based on the embodiment in FIG. 8, in another implementation of the embodiments of this application, another method for notifying a terminal of a type of to-be-enabled user plane security protection is further provided. As shown in FIG. 10, the method includes the following steps.

Step 1001 to step 1003 are the same as step 801 to step 803, and details are not described herein again.

Step 1004: The first access network device sends a fourth message to the terminal, and correspondingly, the terminal receives the fourth message from the first access network device.

The fourth message carries second indication information, and the second indication information is used to indicate a type of user plane security protection to be enabled by the terminal.

It should be noted that the second indication information is the same as the first indication information described in the foregoing embodiment. It may be understood that the first access network device directly sends the first indication information sent to the second access network device in the foregoing embodiment to the terminal.

Optionally, the fourth message further carries one or both of a user plane security algorithm determined by the first access network device and granularity information corresponding to the second indication information.

Optionally, the fourth message may carry a security algorithm determined by the first access network device, and the security algorithm includes at least an available user plane protection algorithm. Alternatively, the fourth message does not carry the security algorithm determined by the first access network device. Before transferring the fourth message, the first access network device sends the determined security algorithm to the terminal by using another message, for example, by using an AS SMC message.

Step 1005: The terminal determines a user plane security algorithm based on the second indication information.

Optionally, the terminal may further generate a user plane key based on the user plane security algorithm.

For example, if the second indication information instructs to enable user plane encryption protection but not to enable user plane security protection, the terminal determines a user plane encryption algorithm, and generates a user plane encryption key based on the user plane encryption algorithm.

For example, if the second indication information is a specific user plane encryption algorithm and a specific user plane integrity protection algorithm, the terminal generates a user plane encryption key based on the user plane encryption algorithm indicated by the second indication information, and generates a user plane integrity protection key based on the user plane integrity protection algorithm indicated by the second indication information.

According to the security protection method provided in this embodiment of this application, the first access network device may directly send the first indication information to the terminal without forwarding by the second access network device, so that efficiency of establishing dual connectivity can be improved.

The foregoing mainly describes the solutions provided in the embodiments of this application from a perspective of interaction between the first access network device, the second access network device, and the terminal. It may be understood that, to implement the foregoing functions, the first access network device, the second access network device, and the terminal include corresponding hardware structures and/or software modules for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, function unit division may be performed on the access network device, the terminal, or the like based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of this application, unit division is an example, and is merely logical function division. In actual implementation, another division manner may be used.

Figure 11:
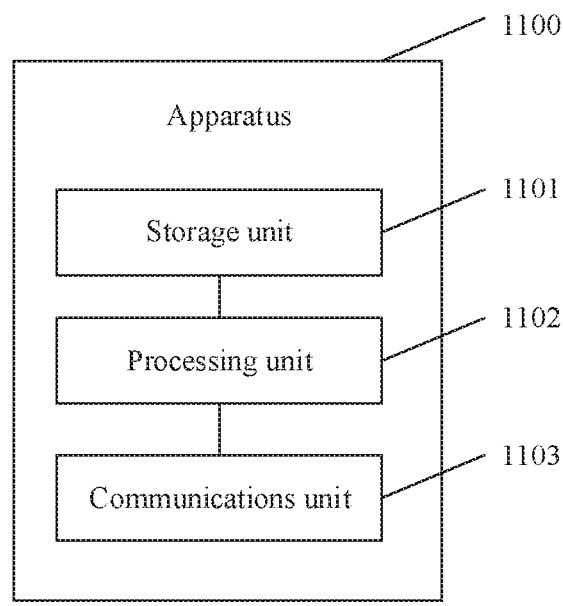
FIG. 11 is a schematic structural diagram of an apparatus according to an embodiment of this application.

When an integrated unit is used, FIG. 11 is a schematic block diagram of an apparatus according to an embodiment of the present invention. The apparatus may exist in a form of software, or may be an access network device, or may be a chip in an access network device. The apparatus 1100 includes a processing unit 1102 and a communications unit 1103. The processing unit 1102 is configured to control and manage an action of the apparatus 1100. The communications unit 1103 is configured to support communication between the apparatus 1100 and another network element (for example, a terminal, another access network device, or a core network element).

In a possible implementation, the apparatus 1100 may be the first access network device described above or a chip in the first access network device. The processing unit 1102 may support the apparatus 1100 in performing an action performed by the first access network device in the foregoing method example. For example, the processing unit 1102 is configured to support the apparatus 110 in performing step 503 in FIG. 5, step 603 in FIG. 6, step 705 in FIG. 7, step 803 and step 804 in FIG. 8, step 903 in FIG. 9, step 1003 in FIG. 10, and/or another process used for the technology described in this specification. The communications unit 1103 may support the apparatus 1100 in performing a communication process between the first access network device in the foregoing method example and another device. For example, the communications unit 1103 may support the apparatus 1100 in performing steps 502, 504, and 508 in FIG. 5, steps 601, 602, 604, 605, and 606 in FIG. 6, steps 701 to 704 and 706 to 708 in FIG. 7, step 802 in FIG. 8, step 902 and step 904 in FIG. 9, and step 1002 and step 1004 in FIG. 10.

In another possible implementation, the apparatus 1100 may be the second access network device described above or a chip in the second access network device. The processing unit 1102 may support the apparatus 1100 in performing an action performed by the second access network device in the foregoing method example. For example, the processing unit 1102 is configured to support the apparatus 1100 in performing step 505 in FIG. 5, step 801 in FIG. 8, step 901 in FIG. 9, step 1001 in FIG. 10, and/or another process used for the technology described in this specification. The communications unit 1103 may support the apparatus 1100 in performing a communication process between the second access network device in the foregoing method example and another device. For example, the communications unit 1103 may support the apparatus 1100 in performing steps 501, 502, 504, and 506 to 508 in FIG. 5, steps 601 and 606 in FIG. 6, steps 701 and 708 in FIG. 7, step 802 in FIG. 8, steps 902, 904, and 905 in FIG. 9, and step 1002 in FIG. 10.

The apparatus 1100 may further include a storage unit 1101, configured to store program code and data of the apparatus 1100.

The processing unit 1102 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing unit 1102 may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications unit 1103 may be a communications interface, where the communications interface is a general term. During specific implementation, the communications interface may include a plurality of interfaces. For example, when the apparatus 1100 is a first access network device, the communications interface may include an interface between the first access network device and a second access network device, an interface between the first access network device and a terminal, an interface between the first access network device and a core network element, and/or another interface. For another example, when the apparatus 1100 is a second access network device, the communications interface may include an interface between the second access network device and a first access network device, an interface between the second access network device and a terminal, an interface between the second access network device and a core network element, and/or another interface. The storage unit 1101 may be a memory.

Figure 12:
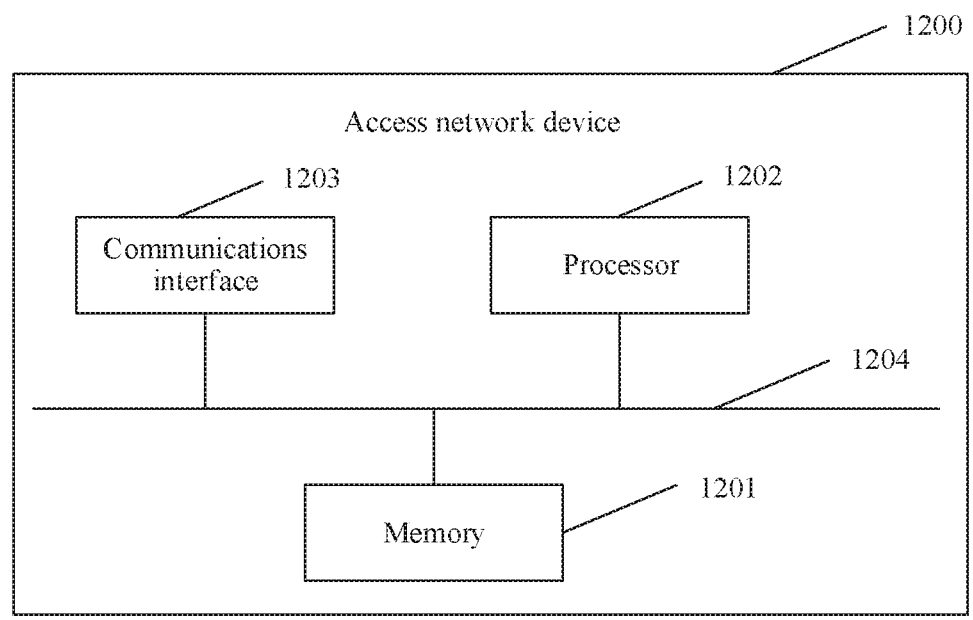
FIG. 12 is a schematic structural diagram of an access network device according to an embodiment of this application.

When the processing unit 1102 is a processor, the communications unit 1103 is a communications interface, and the storage unit 1101 is a memory, a structure of the apparatus 1100 in this embodiment of this application may be a structure of an access network device shown in FIG. 12.

FIG. 12 is a possible schematic structural diagram of an access network device according to an embodiment of this application.

As shown in FIG. 12, the access network device 1200 includes a processor 1202, a communications interface 1203, and a memory 1201. Optionally, the access network device 1200 may further include a bus 1204. The communications interface 1203, the processor 1202, and the memory 1201 are connected to each other by using the bus 1204. The bus 1204 may be a PCI bus, an EISA bus, or the like. The bus 1204 may be classified into an address bus, a data bus, a control bus, and the like. For ease of representation, only one thick line is used to represent the bus in FIG. 12, but this does not mean that there is only one bus or only one type of bus.

The access network device in FIG. 12 may be the first access network device described above, or may be the second access network device described above.

Figure 13:
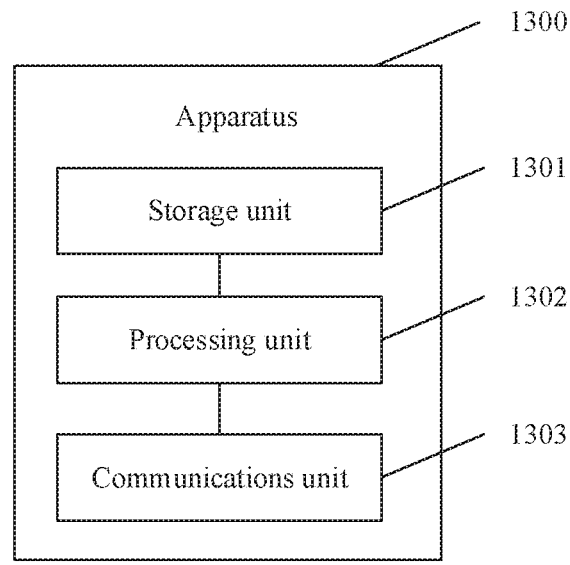
FIG. 13 is a schematic structural diagram of another apparatus according to an embodiment of this application.

When an integrated unit is used, FIG. 13 shows a schematic block diagram of still another apparatus according to an embodiment of this application. The apparatus 1300 may exist in a form of software, or may be a terminal, or may be a chip in a terminal. The apparatus 1300 includes a processing unit 1302 and a communications unit 1303. The processing unit 1302 is configured to control and manage an action of the apparatus 1300. For example, the processing unit 1302 is configured to support the apparatus 1300 in performing step 602 in FIG. 6, step 702 in FIG. 7, step 906 in FIG. 9, step 1005 in FIG. 10, and/or another process used for the technology described in this specification. The communications unit 1303 is configured to support communication between the apparatus 1300 and another network element (for example, a first access network device or a second access network device). For example, the communications unit 1303 is configured to support the apparatus 1300 in performing steps 501, 506, and 507 in FIG. 5, steps 604 and 605 in FIG. 6, steps 706 and 707 in FIG. 7, step 905 in FIG. 9, and step 1004 in FIG. 10. The apparatus 1300 may further include a storage unit 1301, configured to store program code and data of the apparatus 1300.

The processing unit 1302 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing unit 1302 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 1303 may be a transceiver, a transceiver circuit, a communications interface, or the like. The storage unit 1301 may be a memory.

Figure 14:
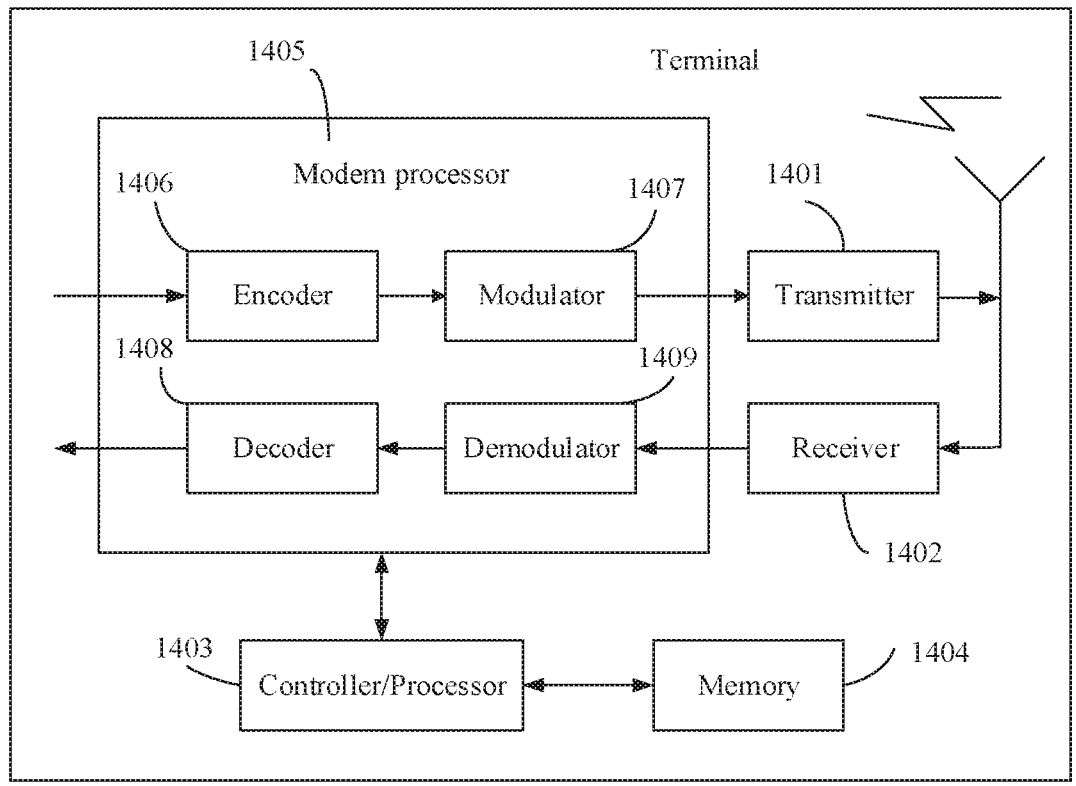
FIG. 14 is a schematic structural diagram of a terminal according to an embodiment of this application.

When the processing unit 1302 is a processor, the communications unit 1303 is a transceiver, and the storage unit 1301 is a memory, the apparatus 1300 in this embodiment of this application may be a terminal shown in FIG. 14.

FIG. 14 is a simplified schematic diagram of a possible design structure of a terminal according to an embodiment of this application. The terminal 1400 includes a transmitter 1401, a receiver 1402, and a processor 1403. The processor 1403 may also be a controller, and is represented as "controller/processor 1403" in FIG. 14. Optionally, the terminal 1400 may further include a modem processor 1405. The modem processor 1405 may include an encoder 1406, a modulator 1407, a decoder 1408, and a demodulator 1409.

In an example, the transmitter 1401 adjusts (for example, performs analog conversion, filtering, amplification, and up-conversion on) the output sample and generates an uplink signal, where the uplink signal is transmitted to the base station in the foregoing embodiments by using an antenna. On a downlink, the antenna receives a downlink signal transmitted by the base station in the foregoing embodiments. The receiver 1402 adjusts (for example, performs filtering, amplification, down-conversion, and digitization on) a signal received from the antenna and provides an input sample. In the modem processor 1405, the encoder 1406 receives service data and a signaling message that are to be sent on an uplink, and processes (for example, formats, encodes, and interleaves) the service data and the signaling message. The modulator 1407 further processes (for example, performs symbol mapping and modulation on) the encoded service data and signaling message, and provides an output sample. The demodulator 1409 processes (for example, demodulates) the input sample and provides symbol estimation. The decoder 1408 processes (for example, de-interleaves and decodes) the symbol estimation and provides the decoded data and signaling message that are sent to the terminal 1400. The encoder 1406, the modulator 1407, the demodulator 1409, and the decoder 1408 may be implemented by the combined modem processor 1405. These units perform processing based on a radio access technology (for example, an access technology in LTE, 5G, and another evolved system) used by a radio access network. It should be noted that when the terminal 1400 does not include the modem processor 1405, the foregoing functions of the modem processor 1405 may also be implemented by the processor 1403.

The processor 1403 controls and manages an action of the terminal 1400, and is configured to perform a processing process performed by the terminal 1400 in the foregoing embodiments of this application. For example, the processor 1403 is further configured to perform the processing processes of the terminal in the methods shown in FIG. 5 to FIG. 10 and/or another process of the technical solutions described in this application.

Further, the terminal 1400 may further include a memory 1404. The memory 1404 is configured to store program code and data that are used for the terminal 1400.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may also be a component of the processor. The processor and the storage medium may be located in an ASIC. In addition, the ASIC may be located in an access network device or a terminal. Certainly, the processor and the storage medium may exist in the access network device or the terminal as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, functional units in the embodiments of the present invention may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementation, a person skilled in the art may clearly understand that this application may be implemented by software in addition to necessary universal hardware or by hardware only. In most cases, the former is a preferred implementation manner. Based on such an understanding, the technical solutions of this application essentially or the part contributing to the prior art may be implemented in a form of a computer program product. The computer program product is stored in a readable storage medium, such as a floppy disk, a hard disk or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A security protection method, comprising:
   obtaining, by a master station, a user plane security policy of a session of a terminal, wherein the user plane security policy indicates whether two types of user plane security protection are enabled, wherein the two types of user plane security protection comprise user plane encryption protection and user plane integrity protection, and wherein the master station communicates with a secondary station under a dual connectivity scenario;
   sending, by the master station to the secondary station, a first message comprising the user plane security policy, security capability of the terminal, and granularity information corresponding to the user plane security policy, wherein the granularity information comprises a session identifier indicating the session, and wherein the security capability includes at least a security algorithm supported by the terminal;
   receiving, by the secondary station, the first message from the master station;
   determining, by the secondary station, a user plane security algorithm based on the user plane security policy and the security capability;
   sending, by the secondary station to the master station, a second message comprising an indication indicating a type of user plane security protection enabled by the secondary station; and
   receiving, by the master station, the second message from the secondary station.

2. The security protection method according to claim 1, wherein the second message further comprises the user plane security algorithm.

3. The security protection method according to claim 1, wherein the security protection method further comprises:
- determining, by the master station, whether the indication is consistent with the user plane security policy; and
- rejecting, by the master station, access of the secondary station in response to determining that the indication is inconsistent with the user plane security policy.

4. The security protection method according to claim 3, wherein the security protection method further comprises:
- in response to determining that the indication is inconsistent with the user plane security policy, reselecting, by the master station, a new base station to replace the secondary station that is rejected access by the master station.

5. The security protection method according to claim 1, wherein the message further comprises an offloading type of the dual connectivity scenario, and the offloading type is secondary-station based offloading based on the secondary station or dual-station based offloading based on the master station and the secondary station.

6. The security protection method according to claim 1, wherein the indication is a first indication, the method further comprising: sending, by the master station, a third message comprising the user plane security algorithm and a second indication indicating the type of the user plane security protection to the terminal.

7. The security protection method according to claim 6, wherein the third message is a radio resource control (RRC) connection reconfiguration request message.

8. A communications system comprising:
- a master station and a secondary station connected under a dual connectivity scenario;
- the master station is configured to:
  - obtain a user plane security policy of a session of a terminal, wherein the user plane security policy indicates whether two types of user plane security protection are enabled, and wherein the two types of user plane security protection comprise user plane encryption protection and user plane integrity protection; and
  - send a first message comprising the user plane security policy, security capability of the terminal, and granularity information corresponding to the user plane security policy, wherein the granularity information comprises a session identifier indicating the session, and wherein the security capability includes at least a security algorithm supported by the terminal; and
- the secondary station is configured to:
  - receive the first message from the master station;
  - determine a user plane security algorithm based on the user plane security policy and the security capability;
  - send, to the master station, a second message comprising an indication indicating a type of user plane security protection enabled by the secondary station; and
- the master station is further configured to receive the second message from the secondary station.

9. The communications system according to claim 8, wherein the secondary station is further configured to:
- determine whether the indication is consistent with the user plane security policy; and
- reject access of the secondary station in response to determining that the indication is inconsistent with the user plane security policy.

10. The communications system according to claim 8, wherein the secondary station is further configured to reselect a base station as the secondary station.

11. The communications system according to claim 8, wherein the message further comprises an offloading type of the dual connectivity scenario, and the offloading type is secondary-station based offloading based on the secondary station or dual-station based offloading based on the master station and the secondary station.

12. The communications system according to claim 8, wherein the indication is a first indication, the secondary station is further configured to send a third message comprising the user plane security algorithm and a second indication indicating the type of the user plane security protection to the terminal.

13. A security protection method, applied to a dual connectivity scenario, wherein the dual connectivity scenario comprises a first access network device and a second access network device, the first access network device is a secondary station in the dual connectivity scenario, the second access network device is a master station in the dual connectivity scenario, and the security protection method comprises:
- receiving, by the first access network device, a first message from the second access network device, wherein the first message comprises a user plane security policy of a session of a terminal, security capability of the terminal, and granularity information corresponding to the user plane security policy, wherein the granularity information comprises a session identifier indicating the session, and the security capability includes at least a security algorithm supported by the terminal, the user plane security policy indicates whether two types of user plane security protection are enabled, wherein the two types of user plane security protection comprise user plane encryption protection and user plane integrity protection;
- determining, by the first access network device, a user plane security algorithm based on the user plane security policy and the security capability; and
- sending, by the first access network device, a second message to the second access network device, wherein the second message is a response message for the first message, the second message comprises first indication information, and the first indication information indicate a types of user plane security protection to be enabled by the secondary station.

14. The security protection method according to claim 13, wherein the first message further comprises an offloading type of the dual connectivity scenario, and the offloading type is secondary-station based offloading based on the secondary station or dual-station based offloading based on the master station and the secondary station.

15. The security protection method according to claim 13, wherein the second message further comprises the user plane security algorithm.

16. An access network device, wherein the access network device is a second access network device applied to a dual connectivity scenario, the dual connectivity scenario comprises a first access network device and the second access network device, the first access network device is a secondary station in the dual connectivity scenario, the second access network device is a master station in the dual connectivity scenario, and the second access network device comprises:
- at least one processor coupled to at least one memory storing instructions and configured to execute the instructions to cause the access network device to:
  - receive a first message from the second access network device, wherein the first message comprises a user plane security policy of a session of a terminal, security capability of the terminal, and granularity information corresponding to the user plane security policy, wherein the granularity information comprises a session identifier indicating the session, and the security capability includes at least a security algorithm supported by the terminal, the user plane security policy indicates whether two types of user plane security protection are enabled, wherein the two types of user plane security protection comprise user plane encryption protection and user plane integrity protection; and determine a user plane security algorithm based on the user plane security policy and the security capability; and send a second message to the second access network device, wherein the second message is a response message for the first message, the second message comprises first indication information, and the first indication information indicate a types of user plane security protection to be enabled by the secondary station.

17. The access network device according to claim 16, wherein the first message further comprises an offloading type of the dual connectivity scenario, and the offloading type is secondary-station based offloading based on the secondary station or dual-station based offloading based on the master station and the secondary station.

18. The access network device according to claim 16, wherein the second message further comprises the user plane security algorithm.

* * * * *